United States Patent
Asterjadhi et al.

(10) Patent No.: US 11,553,405 B2
(45) Date of Patent: Jan. 10, 2023

(54) DISCOVERY CHANNEL FOR UNLICENSED FREQUENCY BAND

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Yan Zhou, San Diego, CA (US); Venkata Ramanan Venkatachalam Jayaraman, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 78 days.

(21) Appl. No.: 16/995,583

(22) Filed: Aug. 17, 2020

(65) Prior Publication Data
US 2021/0037453 A1     Feb. 4, 2021

Related U.S. Application Data

(63) Continuation of application No. 16/009,145, filed on Jun. 14, 2018, now Pat. No. 10,757,638.

(60) Provisional application No. 62/521,989, filed on Jun. 19, 2017.

(51) Int. Cl.
*H04W 48/08* (2009.01)
*H04W 48/16* (2009.01)
(Continued)

(52) U.S. Cl.
CPC .......... *H04W 48/16* (2013.01); *H04W 8/005* (2013.01); *H04W 16/14* (2013.01); *H04W 48/08* (2013.01);
(Continued)

(58) Field of Classification Search
CPC ....... H04W 8/005; H04W 48/16; H04W 4/70; H04W 52/0206; H04W 56/001;
(Continued)

(56) References Cited

U.S. PATENT DOCUMENTS 10,757,638 B2    8/2020  Asterjadhi et al.
2011/0243330 A1  10/2011 Hu et al.
(Continued)

FOREIGN PATENT DOCUMENTS

CN     102577268    7/2012
EP       3563595   11/2019
(Continued)

OTHER PUBLICATIONS

"PCT Application No. PCT/US2018/038092 International Search Report and Written Opinion", dated Oct. 24, 2018, 24 pages.
(Continued)

*Primary Examiner* — Jae Y Lee
*Assistant Examiner* — Aixa A Guadalupe Cruz
(74) *Attorney, Agent, or Firm* — Holland & Hart LLP

(57) ABSTRACT

This disclosure provides systems, methods, and apparatus, including computer programs encoded on computer-readable media, for advertising operating channels that are being operated in an unlicensed frequency band. One or more access points (APs) may transmit discovery information on a dedicated discovery channel for the unlicensed frequency band. The discovery information may indicate at least one operating channel that is being used by an AP for providing wireless access. The discovery information also may include other information useful for a station (STA) to discover APs, operating channels, and operating parameters. The STA may monitor the dedicated discovery channel to obtain the discovery information without conducting an active scanning or passive scanning procedure.

24 Claims, 19 Drawing Sheets

(51) Int. Cl.
*H04W 16/14* (2009.01)
*H04W 48/10* (2009.01)
*H04W 8/00* (2009.01)
*H04W 48/12* (2009.01)
*H04W 48/20* (2009.01)

(52) U.S. Cl.
CPC ........... *H04W 48/10* (2013.01); *H04W 48/12* (2013.01); *H04W 48/20* (2013.01)

(58) Field of Classification Search
CPC ..... H04W 88/08; H04W 48/10; H04W 48/08; H04W 48/12; H04W 48/20; H04W 52/243; H04W 52/244; H04L 27/2655; H04L 67/12; H04L 67/16; H04L 67/1068; H04L 67/1072
See application file for complete search history.

(56) References Cited

U.S. PATENT DOCUMENTS

| | | | | |
|---|---|---|---|---|
| 2014/0301285 A1* | 10/2014 | Ahn | ...................... | H04W 8/005 370/329 |
| 2014/0314003 A1 | 10/2014 | Zhou et al. | | |
| 2017/0170937 A1* | 6/2017 | Chun | .................... | H04L 5/0094 |
| 2017/0171878 A1* | 6/2017 | Chun | ....................... | H04B 7/00 |
| 2018/0368057 A1 | 12/2018 | Asterjadhi et al. | | |
| 2019/0364492 A1* | 11/2019 | Azizi | .................. | H04W 68/005 |
| 2021/0307068 A1* | 9/2021 | Kim | .................. | H04W 74/0808 |

FOREIGN PATENT DOCUMENTS

| | | |
|---|---|---|
| JP | 2013520938 | 6/2013 |
| JP | 2015216651 | 12/2015 |
| JP | 2017041733 | 2/2017 |
| WO | 2015153360 | 10/2015 |
| WO | 2017124011 | 7/2017 |

OTHER PUBLICATIONS

"Standard ECMA-387", 2nd edition, Dec. 2010, 302 pages.

"U.S. Appl. No. 16/009,145 Office Action", dated Jul. 25, 2019, 21 pages.

"U.S. Appl. No. 16/009,145 Final Office Action", dated Jan. 27, 2020, 15 pages.

* cited by examiner

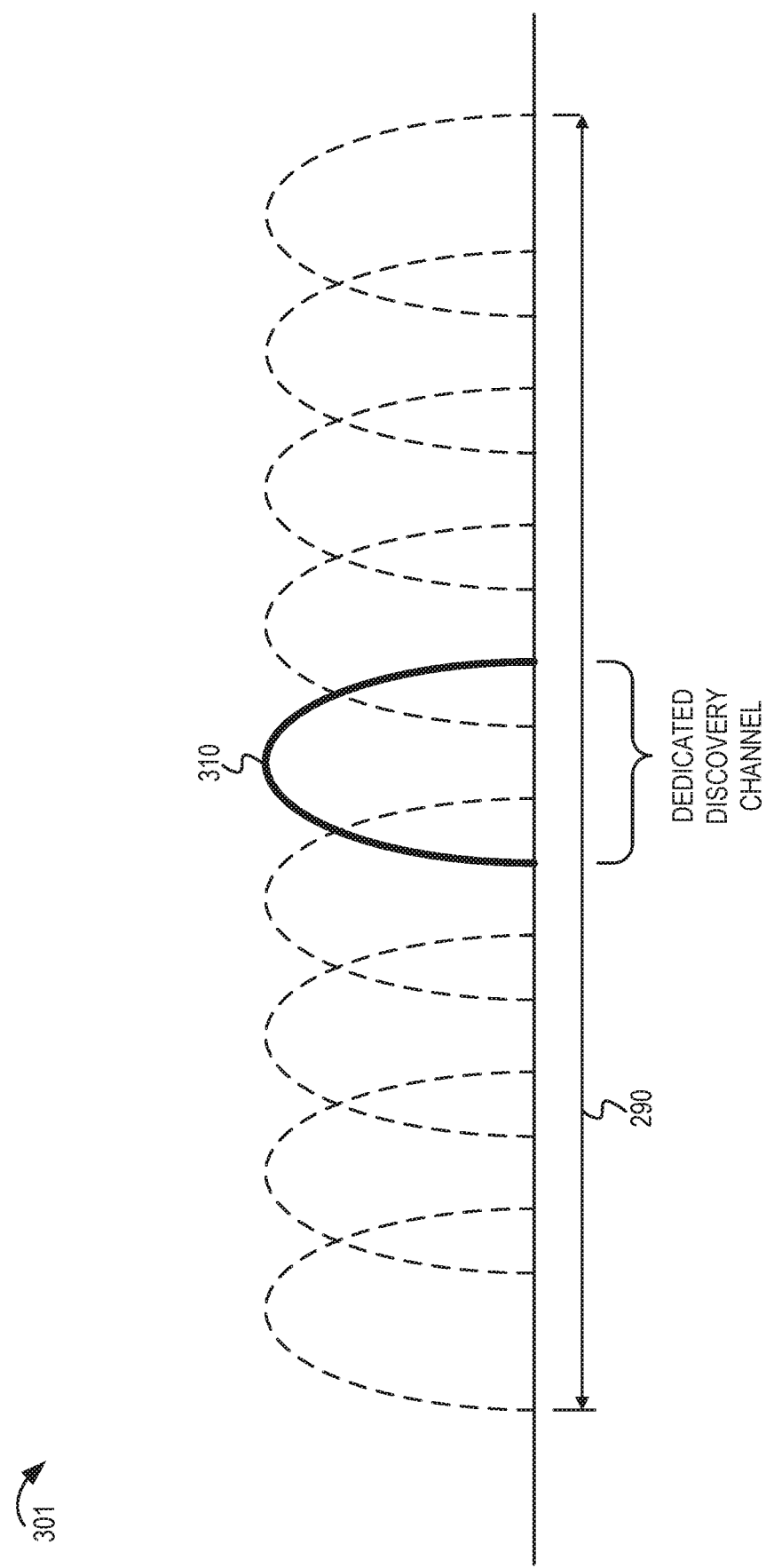

DISCOVERY CHANNEL FOR UNLICENSED FREQUENCY BAND

CROSS-REFERENCE TO RELATED APPLICATIONS

This patent application is a continuation of U.S. patent application Ser. No. 16/009,145 filed on Jun. 14, 2018, which claims priority to U.S. Provisional Patent Application No. 62/521,989 filed Jun. 19, 2017, both entitled "DISCOVERY CHANNEL FOR UNLICENSED FREQUENCY BAND," and assigned to the assignee hereof. The disclosures of the prior applications are considered part of and are incorporated by reference in this patent application.

TECHNICAL FIELD

This disclosure relates to the field of network communication, and more particularly to wireless communication in an unlicensed frequency band.

DESCRIPTION OF THE RELATED TECHNOLOGY

Wireless communication technologies may use unlicensed frequency bands without obtaining a specific license from a governmental agency. Examples of unlicensed frequency bands may include 2.4 GHz frequency band (sometimes also referred to as an "industrial, scientific, and medical" or "ISM" frequency band) and a 5 GHz frequency band (sometimes also referred to as an "Unlicensed National Information Infrastructure" or "UNII" frequency band). Technology specifications are being drafted for a 6 GHz frequency band, which may support IEEE 802.11 and, optionally, other wireless technologies.

Within each unlicensed frequency band, there may different operating channels that can be used by an access point (AP) and station (STA) for wireless communication. In this disclosure, an AP may refer to an AP as that term is used in IEEE 802.11 wireless local area networks (WLANs) and also may refer to a base station (such as an eNodeB or Home eNodeB) as that term is used for other types of wireless networks. The AP provides wireless access for client STAs to access a network via one or more operating channels. However, due to the increasing quantity of available channels associated with each unlicensed frequency band, it may be time-consuming for a STA to determine the proper operating channel to utilize for wireless access to the AP.

SUMMARY

The systems, methods, and devices of this disclosure each have several innovative aspects, no single one of which is solely responsible for the desirable attributes disclosed herein.

One innovative aspect of the subject matter described in this disclosure can be implemented by a first access point (AP). The first AP may utilize, from among various operating channels within an unlicensed frequency band, at least a first operating channel to provide wireless access to a network. The first AP may transmit discovery information via a dedicated discovery channel for the unlicensed frequency band. The discovery information may include a first identifier of the first operating channel utilized by the first AP.

In some implementations, the dedicated discovery channel may be located at a center channel of the unlicensed frequency band In some implementations, the dedicated discovery channel for the unlicensed frequency band may be located outside of the unlicensed frequency band.

In some implementations, transmitting the discovery information may include transmitting the discovery information in a discovery message that is broadcast on the dedicated discovery channel.

In some implementations, the dedicated discovery channel may be known to one or more stations that utilize the unlicensed frequency band.

In some implementations, the dedicated discover channel may be specified by at least a first technology standard adopted by the one or more stations.

In some implementations, the first AP may transmit the discovery information according to a first periodic interval.

In some implementations, the first periodic interval may be specified by a first technology standard adopted by the one or more stations.

In some implementations, the first periodic interval specified by the first technology standard may be different from a second periodic interval specified by a second technology standard adopted by other stations that utilize the unlicensed frequency band.

In some implementations, the discovery information may further include at least one member selected from a group consisting of basic service set (BSS) information, service set identification (SSID), operating parameters for the first operating channel, wireless service capabilities of the first AP, a list of supported protocols, and a list of other channels being utilized by the first AP.

In some implementations, the discovery information may further include an indicator to indicate whether the first AP will permit a negotiation of one or more operating parameters shared between the first AP and a first station.

In some implementations, the first AP may determine a second operating channel that is utilized by a second AP. The first AP may determine aggregated discovery information that identifies the first operating channel utilized by the first AP and the second operating channel utilized by the second AP. The first AP may transmit the aggregated discovery information on the dedicated discovery channel.

In some implementations, the discovery information may be included in a technology-specific payload of a message transmitted on the dedicated discovery channel. The message may include a header that is decodable by a first class of devices and a second class of devices. The header may indicate a technology type of the technology-specific payload.

In some implementations, utilizing the first operating channel may include scheduling uplink and downlink transmissions for one or more stations on the first operating channel according to an AP-managed schedule.

In some implementations, transmitting the discovery information may include determining an inactive period in the AP-managed schedule, switching from the first operating channel to the dedicated discovery channel, and transmitting the discovery information on the dedicated discovery channel during the inactive period.

In some implementations, the dedicated discovery channel may be located at a frequency range associated with one of the plurality of operating channels. The frequency range may be used as the dedicated discovery channel during some periods of time and the frequency range is used as one of the plurality of operating channels during other periods of time.

In some implementations, the dedicated discovery channel may include a primary dedicated discovery channel and a secondary dedicated discovery channel. The first AP may determine that the primary dedicated discovery channel is unusable. The first AP may transmit the discovery information via the secondary dedicated discovery channel.

In some implementations, determining that the primary dedicated discovery channel is unusable may include determining that the primary dedicated discovery channel is saturated. In some implementations, the primary dedicated discovery channel may be temporarily unavailable. For example, the primary dedicated discovery channel may be inaccessible by any device at a particular time or location (or may be accessible only for transmission of very short packets). The first AP may transmit an indicator on the primary dedicated discovery channel to indicate that the discovery information will be transmitted via the secondary dedicated discovery channel.

In some implementations, determining that the primary dedicated discovery channel is unusable may include determining that the primary dedicated discovery channel is unusable due to signal interference from another transmitter or to another transmitter.

In some implementations, transmitting the discovery information may include utilizing a collision avoidance mechanism to contend for access to the dedicated discovery channel before transmitting the discovery information.

In some implementations, transmitting the discovery information may include transmitting the discovery information in a first timeslot on the dedicated discovery channel.

In some implementations, the first timeslot may be shared by a group of APs that include the first AP and a second AP. Each AP in the group of APs may alternate utilization of occurrences of the first timeslot in a repeating sequence of timeslots.

In some implementations, the first timeslot may be assigned to the first AP by a central controller.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3A depicts an example channel map having a dedicated discovery channel for an unlicensed frequency band.

Like reference numbers and designations in the various drawings indicate like elements.

DETAILED DESCRIPTION

Figure 1:
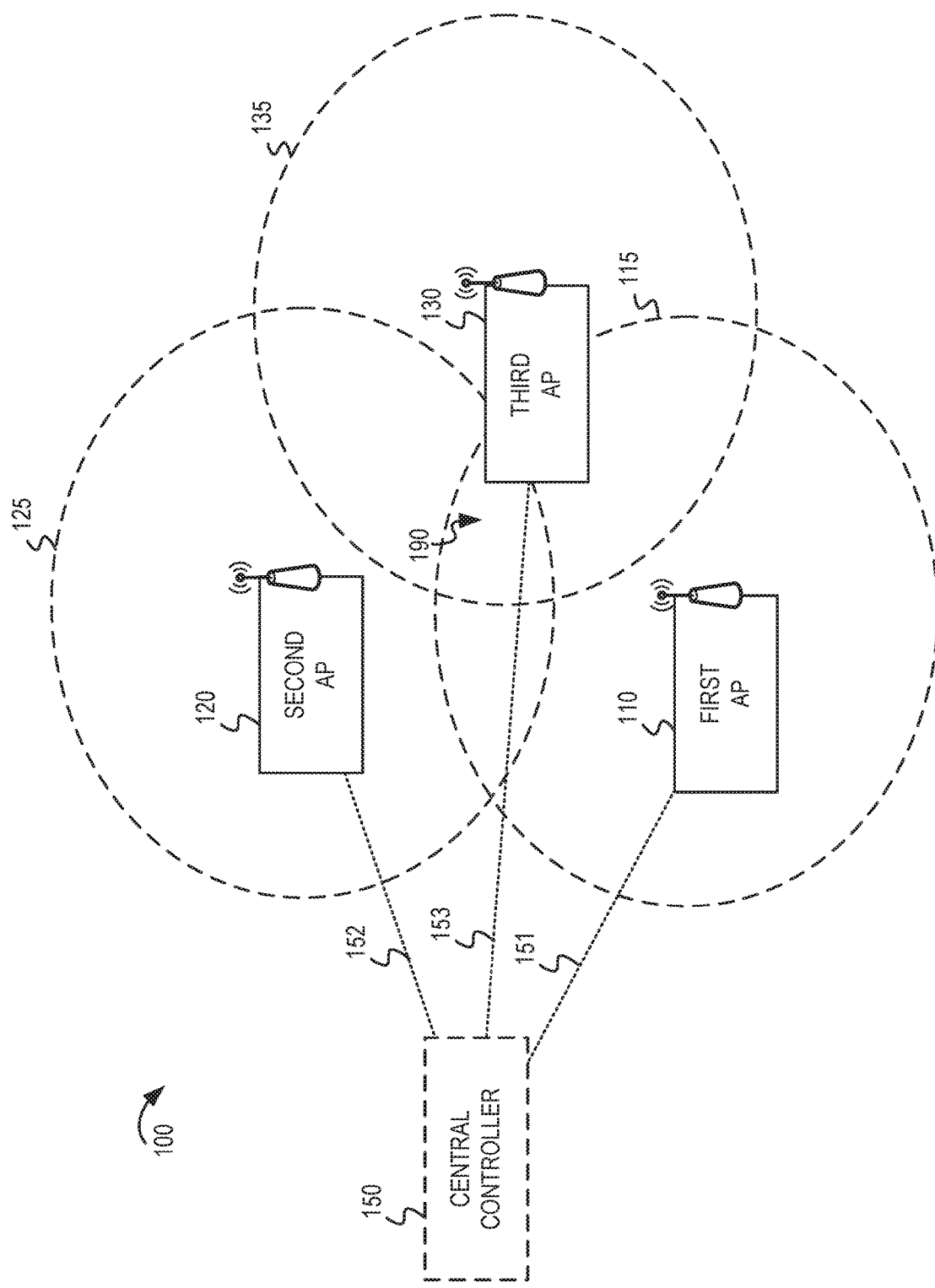
FIG. 1 depicts a system diagram of an example network with multiple access points (APs) operating in an unlicensed frequency band.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A network in a home, apartment, business, or another area may include one or more access points (APs). In some deployments, the APs may be associated with a same local area network. The local area network (LAN) (sometimes also referred to as a wireless local area network or WLAN) may provide access to a broadband network. For example, a gateway device (such as a central AP or router) can couple to the broadband network through a cable, a fiber optic, a powerline, or DSL network connection. In other deployments, there may be multiple APs within an environment which are related to different networks. The multiple APs may each operate on one or more operating channels within an unlicensed frequency band. A channel may refer to a portion of the unlicensed frequency band. Each channel may have a pre-defined central frequency and channel width. An operating channel is used by the AP to communicate with stations (STAs) that have a wireless association with the AP. Similarly, the STAs utilize the channel to communicate (via a wireless association) with the AP. The IEEE 802.11 standards may define a Basic Services Set (BSS) as one wireless interface of the AP, the operating channel (and its configuration), and all devices that are associated with the wireless interface. Some APs are capable of determining which operating channel is least congested and establishing itself on that operating channel. In some implementations, a central controller may assign the operating channels that can be used by each AP within a geographic area.

The concepts in this disclosure may be used with any unlicensed frequency band (or collection of unlicensed frequency bands). However, for brevity, this disclosure uses the 6 GHz unlicensed frequency band as an example for several of the Figures. The 6 GHz band is expected to be an unlicensed frequency band which is open for operation by next generation APs and STAs. For example, the 6 GHz band may be used by IEEE 802.11 devices that follow the 802.11ax amendment or beyond. The 6 GHz band also may be concurrently used by other types of wireless communication technologies, including LTE, Bluetooth™, or other technologies. Wireless transmissions on the operating channels within the 6 GHz band may be fully scheduled (rather than contention based access). An AP may schedule all transmissions by the AP or STAs within the BSS. In this disclosure, an AP refers to any type of access point (or base station) that may utilize the unlicensed frequency band and which provides wireless access via an operating channel in the unlicensed frequency band. While the channel map for the 6 GHz band has not been ratified yet, it is expected to provide a greater number of operating channels than previously available. While this increases the quantity of APs (and wireless communication technologies) which may coexist in the 6 GHz band, this may create a problem for STAs to determine availability and operating channels for the APs in an environment. For example, the STA may use active scanning or passive scanning (both of which are described in more detail in FIG. 2) to identify and locate available APs. However, traditional procedures for active scanning and passive scanning can be time consuming and may consume more power in the unlicensed frequency band due to the larger quantity of operating channels.

In accordance with this disclosure, a dedicated discovery channel can be used to advertise operating channels regarding multiple APs. For example, the dedicated discovery channel can be reserved for use by an AP to announce discovery information about which operating channel(s) are being used. The discovery information also may include information about the BSS, current channel conditions, or operating parameters associated with the operating channel used by the AP. The discovery information may be sent in periodic messages having a predetermined interval known by all STAs that can access that unlicensed frequency band. In some implementations, the discovery information includes minimal information for a STA to determine whether the AP to which they intend to associate is operating in the area. The discovery information also may include the operation modes (capabilities, functionalities, or the like), that the AP desires the STA to have enabled before associating with the AP and also may contain the subset of channels (and other resources) the AP is using in its BSS.

Particular implementations of the subject matter described in this disclosure can be implemented to realize one or more of the following potential advantages. The discovery information for multiple APs may be transmitted in the same dedicated discovery channel of the unlicensed frequency band. This may obviate the need for the STA to actively or passively scan all of the operating channels to find a particular AP's operating channel. Furthermore, a potential uncertainty could exist if the STA does not know how long to wait in the absence of the discovery information. In an implementation, the discovery information is sent according to a predetermined interval that is known to devices that utilize the unlicensed frequency band. In this implementation, the devices can rely on receiving the discovery information within the predetermined interval. The discovery information may enable STAs to determine if they are eligible to operate with a particular AP. For example, even if a STA may satisfy the requirements for a wireless association with a first AP, the first AP may impose restrictions that may not be satisfactory to the STA. The discovery information may include enough information for the STA to determine whether to associate with the first AP as well as the operating channel of the first AP. The discovery information also may indicate whether the first AP will permit a negotiation between the STA and the first AP regarding wireless access parameters.

FIG. 1 depicts a system diagram of an example network with multiple APs operating in an unlicensed frequency band. The network 100 includes multiple APs, including a first AP 110, a second AP 120, and a third AP 130. Each of the multiple APs may provide wireless access for STAs (not shown) within a wireless coverage area. For example, in FIG. 1, the first AP 110 is providing a first wireless coverage area 115, the second AP 120 is providing a second wireless coverage area 125, and the third AP 130 is providing a third wireless coverage area 135. Each AP may utilize a different operating channel within its respective wireless coverage area. As described above, an operating channel may be specified within an unlicensed frequency band. Because the operating channels may have different frequency ranges, they may coexist within the same environment. For example, shown at area 190, all three of the first wireless coverage area 115, the second wireless coverage area 125, and the third wireless coverage area 135 may successfully be used in the area 190 because they are using different operating channels. In some cases, the operating channels may have frequency ranges that overlap each other slightly without negating the benefits of frequency separation.

In some implementations, a central controller 150 may assign the operating channels which can be used by each AP. For example, shown as dotted lines 152, the central controller 150 may have the authority to assign the operating channels used by each of the first AP 110, the second AP 120, and the third AP 130. The central controller 150 may be in the same logical network as one of the APs or may be separate. In some implementations, the central controller 150 is geographically located near the environment where the APs are operating. While in other implementations, the central controller 150 may be geographically distant from where the APs operate but may still provide management oversight to assign the operating channels within the unlicensed frequency band. In some implementations, the central controller may be one of the APs.

Figure 6:
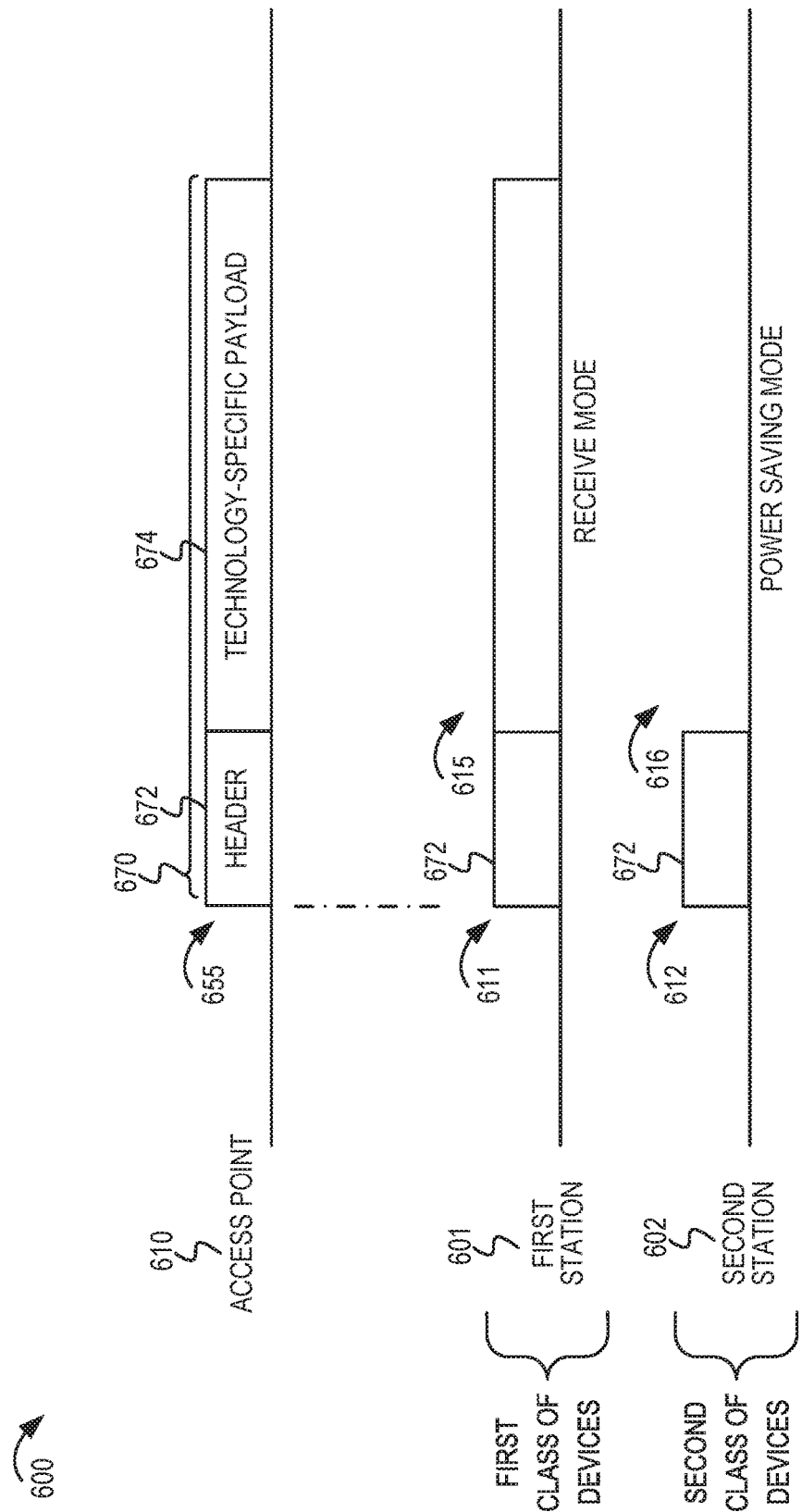
FIG. 6 depicts a message timing diagram in which discovery information can be included in a technology-specific payload of a message.

In the 6 GHz unlicensed frequency band, the assignment of operating channels may be managed, or coordinated, by a central entity. The channel map for the 6 GHz unlicensed frequency band has not yet been ratified. However, FIG. 6 provides an example in which to describe operating channels within an unlicensed frequency band, and some of the challenges that may result from active scanning or passive scanning a large quantity of operating channels.

Figure 2:
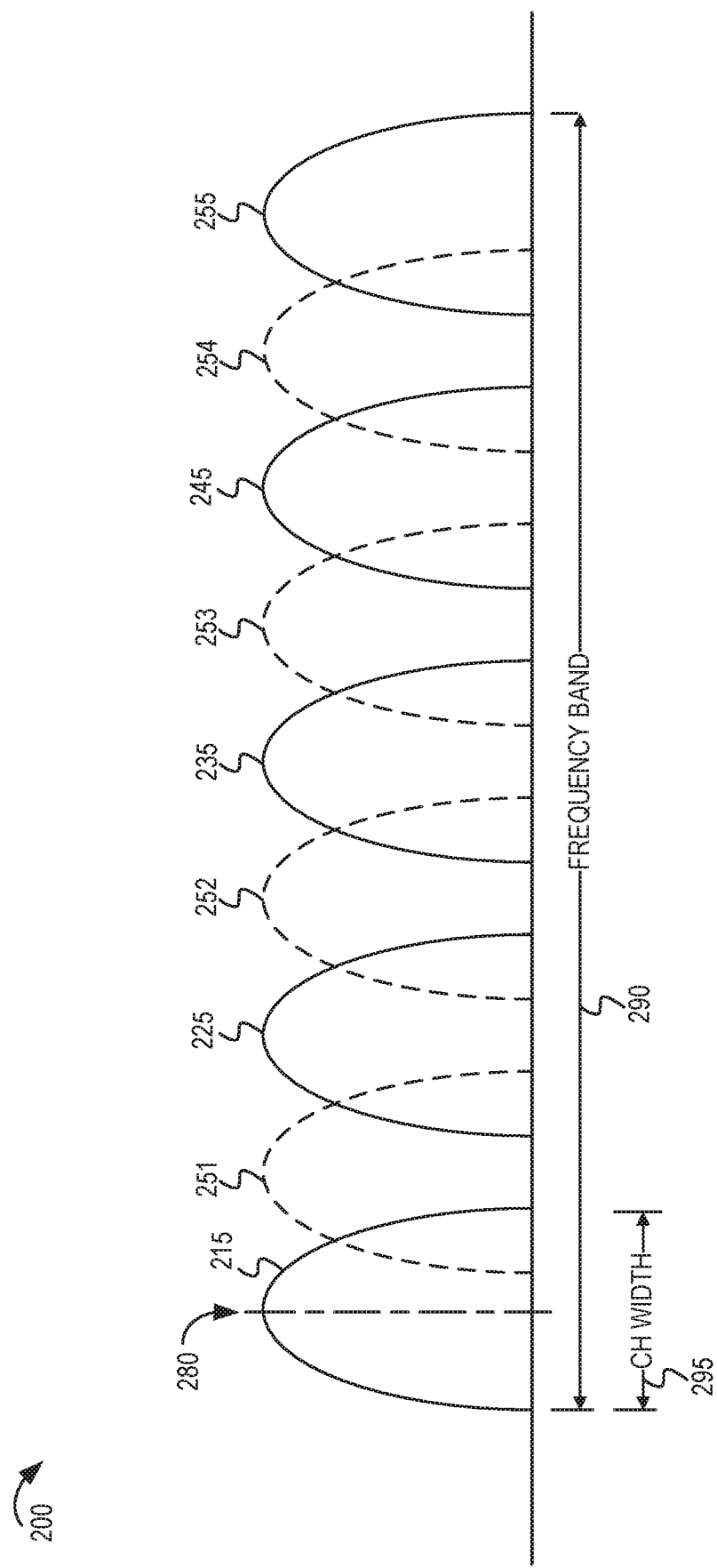
FIG. 2 depicts an example channel map with multiple operating channels in an unlicensed frequency band.

FIG. 2 depicts an example channel map with multiple operating channels in an unlicensed frequency band. The example channel map 200 shows an unlicensed frequency band 290 having many operating channels, including a first operating channel 215, a second operating channel 225, a third operating channel 235, a fourth operating channel 245, and a fifth operating channel 255. These first set of operating channels may be considered non-overlapping because there is frequency separation between them. However, in a typical channel map, the channel definitions may include overlapping channels, such as overlapping channels 251, 252, 253, and 254. Each of the operating channels (215, 225, 235, 245, 251, 252, 253, 254 and 255) may be referred to by a channel number. Each channel may be defined by a center frequency and a channel width, such as the center frequency 280 and channel width 295 associated with the first operating channel 215. Although each channel in the channel map 200 shows a uniform channel width, an unlicensed frequency band may define different channel widths for each channel in the unlicensed frequency band. Furthermore, channels in an unlicensed frequency band may not be adjacent to each other. Channel numbering (such as lowest to highest) may be unrelated to the frequency; for example, there can be a pre-defined mapping of channels and the channels may be spread throughout the unlicensed frequency band.

Absent the improvement of this disclosure, a traditional STA may scan the operating channels to locate which operating channel is being used by an AP of interest to the STA. Two scanning methods are traditionally used: active scanning and passive scanning. These are described below, along with potential challenges associated with each.

In active scanning, a STA tunes to an operating channel, sends a message (such as a probe request message), and waits for a period of time to receive a response (such as a probe response) from an AP on that operating channel. If the STA does not receive a response from the AP of interest, then the STA switches to another operating channel and performs the same process (probe request, and wait for probe response). On each operating channel, the STA may wait for a minimal amount of time before determining that there is no response and switching to the next candidate operating channel. However, this can be time-consuming if the STA actively scan multiple operating channels before receiving a response from the desired AP. Furthermore, if there are many STAs that are actively scanning the unlicensed frequency band, there may be a pollution of probe requests and probe responses. And each time the STA performs an active scan, the STA may consume more power due to transmission and reception of messages on multiple operating channels.

In passive scanning, each AP is configured to periodically generate and transmit messages to advertise its presence, capabilities and other information. For example, in IEEE 802.11, an AP may transmit frames (referred to as "beacon" frames) every beacon interval. A STA may tune to an operating channel, and monitor the channel for a period of time (associated with the beacon interval) to receive a beacon frame from an AP on that operating channel. If the STA does not receive a response from the AP of interest, then the STA switches to another operating channel and performs the same process (monitor and wait for beacon frame). As with active scanning, a STA that is using passive scanning may scan multiple operating channels before receiving a beacon frame from the desired AP.

The amount of time used by a STA to perform active scanning or passive scanning may depend on the wait time on each channel and the quantity of operating channels that are scanned before locating the proper operating channel for an AP of interest. For example, the amount of time may be calculated in terms of a worst case as being T*N, where T is the minimum amount of wait time residing in one channel, and N is the total quantity of channels in the unlicensed frequency band. For passive scanning, the minimum amount of wait time to monitor for a beacon frame may be unknown by the STA. For example, if the STA is scanning each channel for 20 ms (expecting the beacon interval to be 20 ms or less), the STA may miss a beacon frame from an AP that has a much larger beacon interval (such as 400 ms). The beacon interval may be specific to each AP and may be inconsistent among the various operating channels.

As described above, the quantity of channels may greatly impact the amount of time that could be consumed by a STA that is performing active scanning or passive scanning. In the 2.4 GHz unlicensed frequency band, there are 14 channels defined. However, each jurisdiction may determine which channels are allowed to be used in that jurisdiction. In the United States, 11 channels from the 2.4 GHz band are allowed to be used for unlicensed transmissions by IEEE 802.11 equipment. In the 5 GHz unlicensed frequency band, there are 23 non-overlapping channels defined (40 total channels counting overlapping channels). Some STAs may be capable of utilizing both the 2.4 GHz band and the 6 GHz band. Thus, the STA may perform active or passive scanning for the combination of channels from multiple unlicensed frequency bands. Furthermore, there are expected to be many more channels defined in the 6 GHz unlicensed frequency band. For example, it is expected that the channel map for the 6 GHz channel map may include 160 channels or more.

For a STA that wishes to locate an AP in the 6 GHz unlicensed frequency band, the process of active scanning or passive scanning may take a significantly longer time due to the quantity of channels. Furthermore, the power consumption of tuning to each operating channel and transmitting or scanning multiple channels may be disadvantageous, especially for battery-powered STAs. In accordance with this disclosure, these potential disadvantages of legacy techniques for scanning may be overcome by the introduction of a dedicated discovery channel.

In some implementations, the dedicated discovery channel can be used to provide discovery information for multiple unlicensed frequency bands. For example, a dedicated discovery channel can include discovery information for one or more of sub 1 GHz, 2.4 GHz, 5 GHz and 6 GHz operating channels.

FIG. 3A depicts an example channel map having a dedicated discovery channel for an unlicensed frequency band. The example channel map 301 is similar to the channel map 200 of FIG. 2, including the definition of various channels within the unlicensed frequency band 290. However, in FIG. 3A, one of the channels is specified as a dedicated discovery channel 310. In one alternative, as shown in FIG. 3A, the dedicated discovery channel 310 may be in a center channel. For example, one of the channels may be reserved for use as the dedicated discovery channel 310 and may not be available as an operating channel. Although the example in FIG. 3A shows the dedicated discovery channel 310 as the center-most channel within the unlicensed frequency band 290, other alternative locations may be possible. For example, the dedicated discovery channel 310 may be a lowest numbered channel or highest numbered channel within the spectrum associated with the unlicensed frequency band 290 (or any channel). Even though some examples in this disclosure show the dedicated discovery channel occupying a particular channel (such as the center channel or lowest numbered channel), the dedicated discovery channel may occupy any one of the channels in the unlicensed frequency band 290. In some implementations, the dedicated discovery channel 310 may occupy only a portion of one of the operating channels. For example, a frequency range associated with an operating channel may be time-divided so that the frequency range is used as the dedicated discovery channel 310 during some periods of time and the frequency range may be used as an operating channel during other periods of time. In another alternative, the dedicated discovery channel 310 may be in a reserved spectrum that is adjacent to the unlicensed frequency band 290 (or even in a separate frequency range from the unlicensed frequency band 290) and not within of the unlicensed frequency band 290. Thus, in this alternative, the dedicated discovery channel 310 may be associated with the unlicensed frequency band 290 without occupying the frequency range associated with the unlicensed frequency band 290. For example, it may be possible to define a dedicated discovery channel within another frequency band (such as the 2.4 GHz band, the 5 GHz band, or another band) which is used by APs to advertise the operating channel(s) they are using within an unlicensed frequency band (such as the 6 GHz band).

Regardless of the location of the dedicated discovery channel 310, the dedicated discovery channel 310 may be specified by one or more technology standards that would use the 6 GHz unlicensed frequency band. In some implementations, the APs and STAs that will utilize operating channels within the unlicensed frequency band would be pre-configured with the location of the dedicated discovery channel 310. In some implementations, a central resource (such as a server at a service provider, regulatory agency, third party provider, or central coordinator) can maintain a record of which dedicated discovery channel is used at various locations. For example, a device such as a STA) may contact the central resource to determine the location of the dedicated discovery channel 310.

One or more APs can send discovery information on the dedicated discovery channel 310. A STA can monitor the dedicated discovery channel 310 to receive the discovery information from the one or more APs. Thus, the STA can monitor a single channel (the dedicated discovery channel 310) to obtain the discovery information (and possibly more information) that it would previously have obtained by switching or scanning the various operating channels individually. Furthermore, each AP may be configured to transmit the discovery information using a predefined periodic interval. For example, a technology standard may define the periodic interval. A STA could be configured to monitor the dedicated discovery channel 310 for the time period associated with the periodic interval. This would enable the STA to monitor for a time period and obtain the discovery information for all APs that support a particular technology standard. This discovery process may reduce the amount of time needed by a STA to obtain the discovery information for multiple APs which may be utilizing operating channels within the unlicensed frequency band.

In some implementations, an AP that is utilizing an operating channel may manage the schedule for the uplink and downlink transmissions on the operating channel. For example, the AP may manage an AP-managed schedule that controls when one or more stations can transmit on the operating channel. Therefore, the AP will not expect unsolicited uplink traffic from stations on the operating channel. The AP could determine an inactive period in the AP-managed schedule. During the inactive period, the AP could switch from the operating channel to the dedicated discovery channel to transmit the discovery information on the dedicated discovery channel.

Figure 3B:
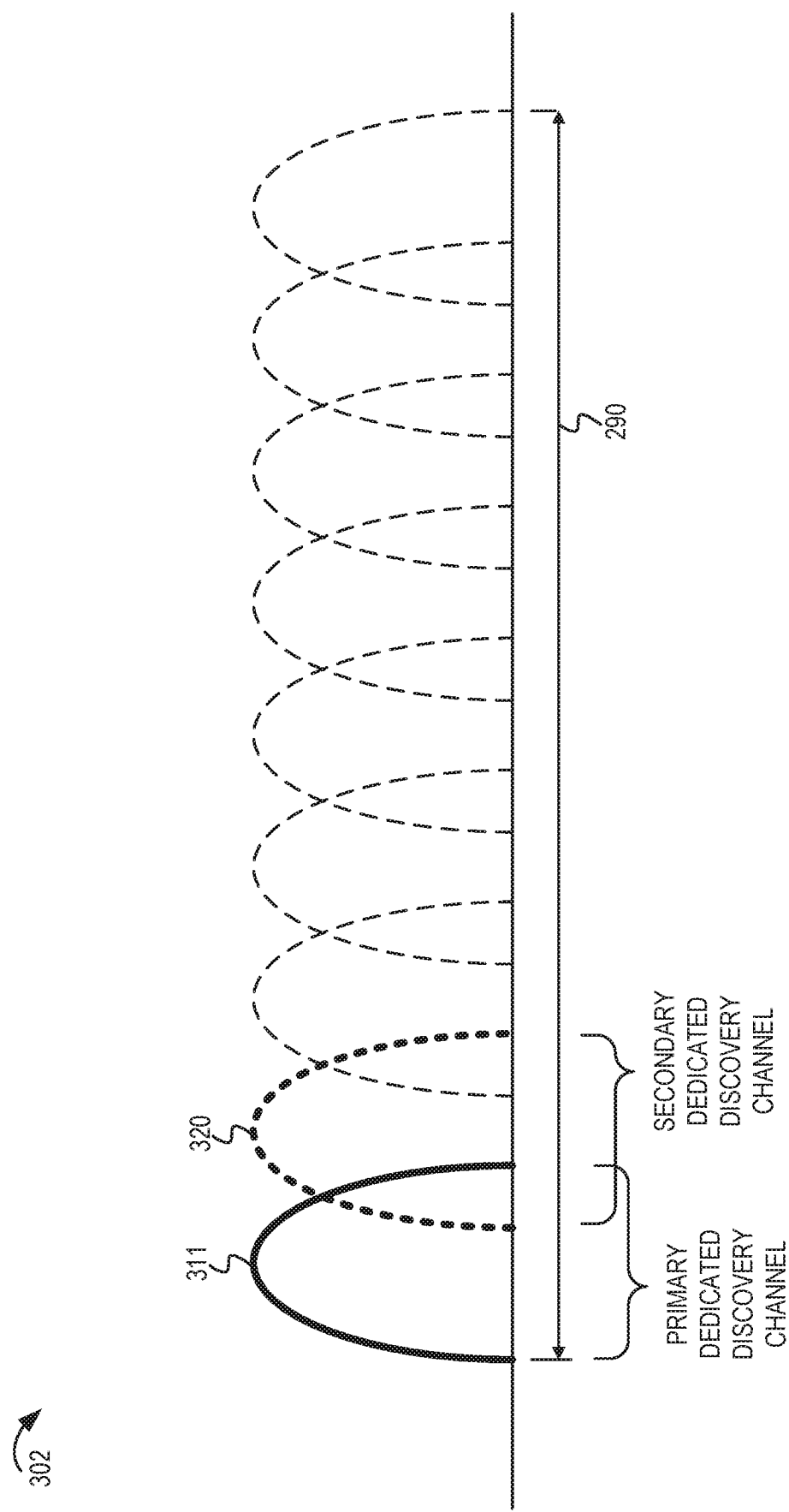
FIG. 3B depicts an example channel map having a primary dedicated discovery channel and a secondary dedicated discovery channel.

FIG. 3B depicts an example channel map having a primary dedicated discovery channel and a secondary dedicated discovery channel. The example channel map 302 is similar to the channel map 301 of FIG. 3A, including the definition of various channels within the unlicensed frequency band 290. In FIG. 3B, the dedicated discovery channel is depicted as a lowest numbered channel (such as at the beginning of the unlicensed frequency band). Furthermore, FIG. 3B illustrates an implementation in which the dedicated discovery channel may occupy more than one of the channels in the channel map. For example, a primary dedicated discovery channel 311 may be similar to the dedicated discovery channel 310 described in FIG. 3A. However, when the primary dedicated discovery channel 311 becomes overcrowded or cannot be utilized in the environment, a secondary dedicated discovery channel 320 may be utilized. Although the primary dedicated discovery channel is shown as the lowest numbered channel and the secondary channel is shown as the next channel, the primary and secondary dedicated discovery channels can be any of the channels of the unlicensed frequency band.

The secondary dedicated discovery channel 320 may serve as an overflow or extension of the primary dedicated discovery channel 311. In some implementations, the secondary dedicated discovery channel 320 may serve as a replacement of the primary dedicated discovery channel 311 (such as when the primary dedicated discovery channel 311 is unusable due to signal inference from another transmitter). In some implementations, the secondary dedicated discovery channel 320 may be predetermined and reserved for use as needed (such as when the primary dedicated discovery channel 311 has become crowded or saturated by other APs transmitting discovery information). In some implementations, an AP can include an indicator or signal on the primary dedicated discovery channel 311 to cause the STA to also monitor the secondary dedicated discovery channel 320. In some implementations, the secondary dedicated discovery channel 320 may share time with an operating channel in the same frequency range.

Figure 4:
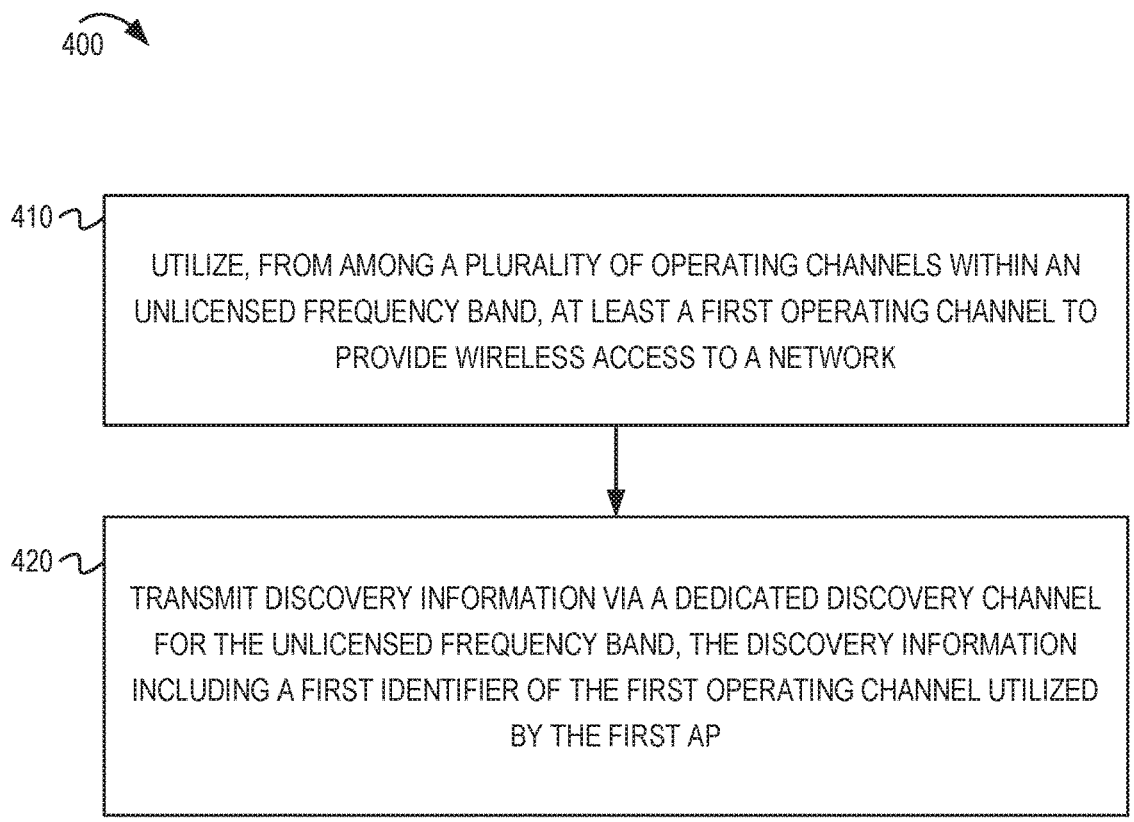
FIG. 4 depicts a flowchart for a first AP capable of sending discovery information via a dedicated discovery channel for an unlicensed frequency band.

FIG. 4 depicts a flowchart for a first AP capable of sending discovery information via a dedicated discovery channel for an unlicensed frequency band. The flowchart 400 begins at block 410. At block 410, the first AP may utilize at least a first operating channel to provide wireless access to a network. The first operating channel may be one of the operating channels within an unlicensed frequency band. In some implementations, the first AP may utilize more than one operating channel.

At block 420, the first AP may transmit discovery information via a dedicated discovery channel for the unlicensed frequency band. The discovery information may include a first identifier of the first operating channel utilized by the first AP. For example, the discovery information may include a channel number (or a list of channel numbers) that the first AP is utilizing to provide wireless access. The discovery information also may include information about a BSS of the first AP. For example, the discovery information may include the SSID of the BSS that is operating on the first operating channel.

As described further below, the discovery information may be included in a discovery message (such as a discovery frame, enhanced beacon frame, or a synchronization frame) that is broadcast on the dedicated discovery channel. There may be different mechanisms for the one or more APs to transmit discovery information on the dedicated discovery channel. In some implementations of the dedicated discovery channel, a collision avoidance mechanism may be used by the APs, such that each AP monitors the dedicated discovery channel before transmitting a discovery message. An example collision avoidance mechanism might be the enhanced distributed channel access (EDCA) which is defined in IEEE 802.11. Another example might be the listen before talk (LBT) access mechanism. To prevent extending beyond the periodic interval for sending discovery information, the first AP may begin collision avoidance early so that if a collision occurs, the first AP can still send the discovery information within the period interval. In some implementations of the dedicated discovery channel, a timeslot mechanism may be used, such that each AP has a timeslot in which to transmit the discovery information. An example of the timeslot mechanism might be similar to time division multiple access (TDMA) in which collisions are avoided by assigning APs to different TDMA timeslots. These mechanisms are further described below in relation to FIGS. 11-13.

Figure 5:
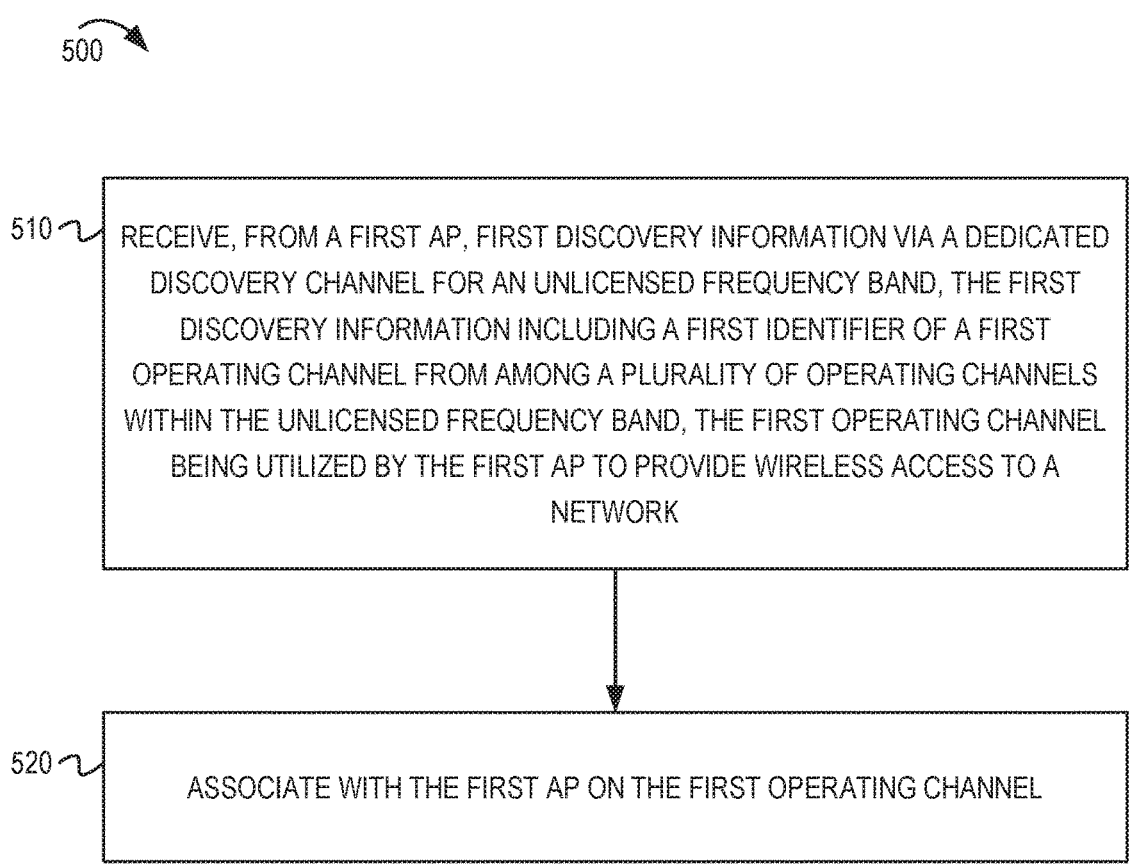
FIG. 5 depicts a flowchart for a first station (STA) capable of receiving discovery information via a dedicated discovery channel for an unlicensed frequency band.

FIG. 5 depicts a flowchart for a first STA capable of receiving discovery information via a dedicated discovery channel for an unlicensed frequency band. The flowchart 500 begins at block 510.

At block 510, the first STA may receive, from a first AP, first discovery information via a dedicated discovery channel for an unlicensed frequency band. The first discovery information may include a first identifier of a first operating channel from among various operating channels within the unlicensed frequency band. The first operating channel is utilized by the first AP to provide wireless access to a network. The first discovery information also may include information about a BSS (such as the SSID) operated on the first operating channel.

At block 520, the first STA may associate with the first AP on the first operating channel. For example, the first STA may determine from the first discovery information that the first AP has the SSID that the first STA is configured to utilize. In that case, the first STA can tune to the first operating channel for the first AP and establish a wireless association with a BSS having the SSID.

In some implementations, the first STA also may receive second discovery information (on the dedicated discovery channel) from a second AP. The second discovery information may include a second identifier of a second operating channel being utilized by the second AP to provide wireless access. The first STA may select the first AP based, at least in part, on the first discovery information and the second discovery information. For example, if the first discovery information and the second discovery information include SSIDs for the BSSs on the first operating channel and the second operating channel, respectively, the first STA can select the first AP having the SSID that the STA is looking for. In another example, the first STA may determine service capabilities for the first AP and the second AP. The service capabilities may be advertised in the first discovery information and the second discovery information, respectively. The first STA may select the first AP based, at least in part, on the service capabilities.

FIG. 6 depicts a message timing diagram in which discovery information can be included in a technology-specific payload of a message. Another interesting feature of the proposed 6 GHz unlicensed frequency band is that the operating channels may be used by devices having different technology types. For example, in addition to IEEE 802.11 devices, various operating channels within the spectrum could be used by other technologies. One example of another technology being proposed is LTE for unlicensed spectrum being developed by the $3^{rd}$ Generation Partnership Project (3GPP) standards-setting body. Other technologies also may be developed to utilize the 6 GHz unlicensed frequency band. In accordance with this disclosure, multiple technology types may transmit discovery information on the dedicated discovery channel to advertise utilized operating channels. However, there may be an opportunity for coordinating the structure of a discovery message such that at least part of the discovery message can be decoded by STAs implementing different technology types.

In the message timing diagram 600, an access point 610 may transmit (shown at 655) a discovery message 670 on the dedicated discovery channel. The discovery message 670 may include a header 672 before a technology-specific payload 674. The header 672 may be uniformly defined for multiple technology types. For example, the IEEE 802.11 specification and LTE specification may use a consistent definition of the structure and contents of the header 672. The header 672 may include an indication of the technology type that the access point 610 is utilizing for the technology-specific payload 674.

FIG. 6 shows two STAs that may receive the discovery message 670. A first STA 601 may belong to a first class of devices and may implement a first technology type used by the first class of devices. For example, the first STA 601 may implement an IEEE 802.11 technology. The second STA 602 may belong to a second class of devices and may implement a second technology type used by the second class of devices. For example, the second STA 602 may implement an LTE technology.

In FIG. 6, both the first STA 601 and the second STA 602 may begin reception of the discovery message 670. For example, the first STA 601 may receive (shown at 611) the discovery message 670 and decode the header 672. The first STA 601 may determine from the header 672 that the discovery message 670 includes a technology-specific payload 674 that is relevant to the first class of devices. In response to determining that the first STA 601 implements the technology type of the technology-specific payload 674, the first STA 601 may continue to receive the discovery message 670 and decode the technology-specific payload 674. For example, shown at 615, the first STA 601 may stay in a receive mode for the remaining duration of the discovery message 670.

In contrast to the first STA 601, the second STA 602 may not implement a technology type for the technology-specific payload 674. The second STA 602 may begin reception of the discovery message 670 (shown at 612). The second STA 602 may decode the header 672 and determine from the header 672 that the discovery message 670 includes a technology-specific payload 674 that is not relevant to the second class of devices. In response to determining that the second STA 602 does not implement the technology type of the technology-specific payload 674, the second STA 602 may disregard the technology-specific payload 674. In some implementations, the second STA 602 may enter a power saving mode (shown at 616) for a remaining duration of the discovery message 670.

Figure 7:
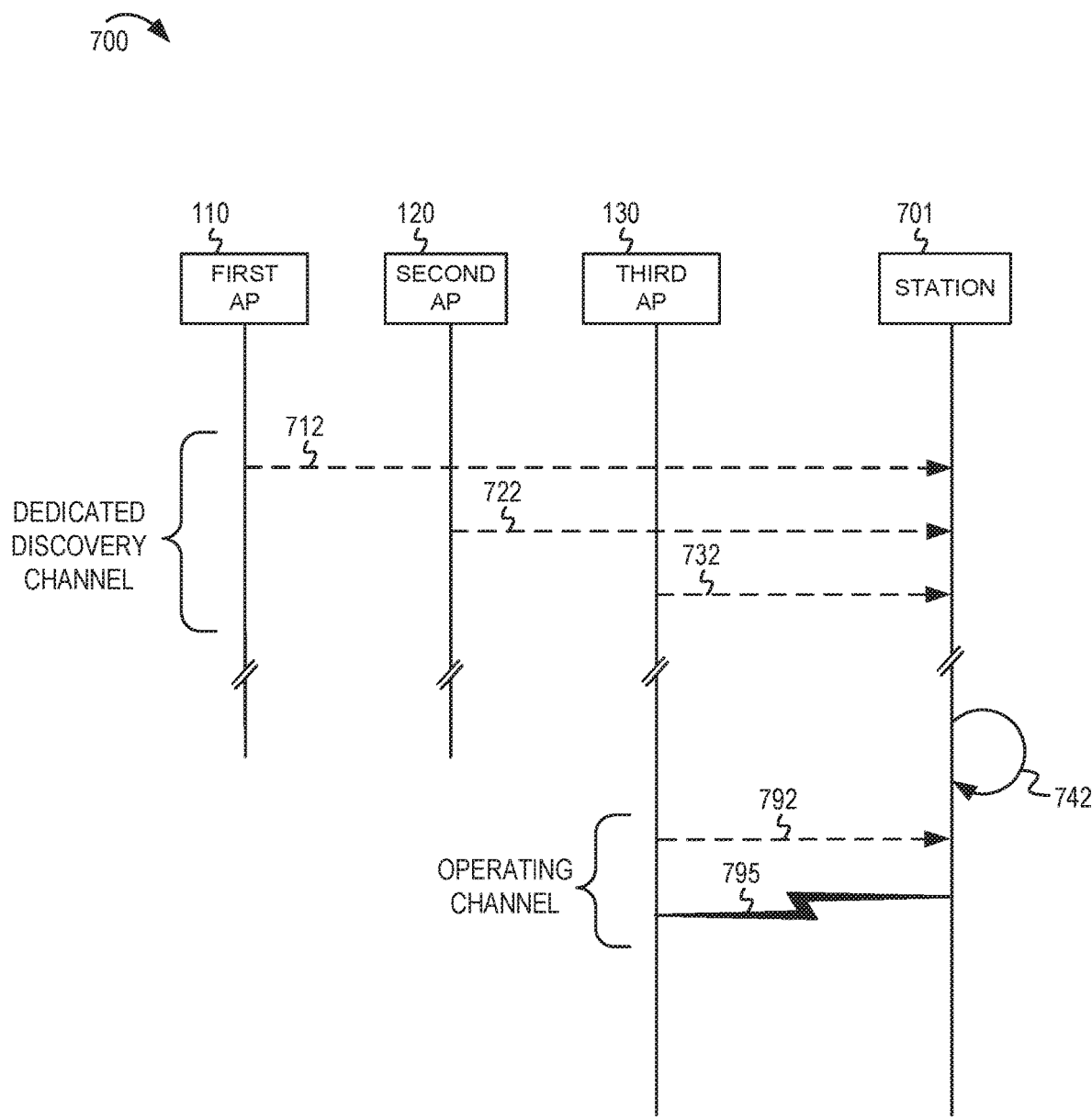
FIG. 7 depicts a message flow diagram of example messages in which multiple APs indicate their operating channels via a dedicated discovery channel.

FIG. 7 depicts a message flow diagram of example messages in which multiple APs indicate their operating channels via a dedicated discovery channel. The message flow diagram 700 shows the first AP 110, the second AP 120, and the third AP 130 sending discovery information to a STA 701. For example, the first AP 110 sends a first discovery message 712 to the STA 701. The second AP 120 sends a second discovery message 722 to the STA 701. The third AP 130 sends a third discovery message 732 to the STA 701. Each of the discovery messages 712, 722, and 732 are transmitted on the dedicated discovery channel. The STA 701 may monitor the dedicated discovery channel for a period of time to receive the discovery messages from any APs which are within range of the STA 701.

In some implementations, the discovery messages 712, 722, and 732 may be short messages (such as a short beacon message or a short system information message). The discovery messages 712, 722, and 732 may be transmitted often (such as a short periodic interval between repeating the discovery messages 712, 722, and 732) so that the STA can monitor the dedicated discovery channel and quickly discover the APs in that location. The short discovery messages 712, 722, and 732 may provide enough information (such as an operating channel and SSID, or equivalent) so that the STA 701 can decide whether to go to a particular operating channel. In some implementations, the discovery messages 712, 722, and 732 may include capability information about the capabilities available at the AP (such as a list of protocols, operation, functionalities supported by AP). In some implementations, the discovery messages 712, 722, and 732 may include AP requirements information about the capabilities that the AP desires that the STA have before the STA 701 can utilize the AP (such as a list of protocols, operation, functionalities supported by STA). In some implementations, the discovery messages 712, 722, and 732 may include BSS operation parameters (such as the location of operating channels for the BSS of the AP, dynamically changing parameters or the like).

At 742, the STA 701 may select which AP to utilize based on the discovery information in the discovery messages 712, 722, and 732. Ideally, the discovery messages 712, 722, and 732 include the information typically used by the STA 701 to select an AP. However, if the STA 701 needs additional information (other than what is included in the discovery messages 712, 722, and 732), the STA 701 may tune (not shown) to one or more of the operating channels advertised in the discovery messages 712, 722, and 732 to obtain the additional information from the APs. In the example of FIG. 7, the STA 701 selects the third AP 130.

After selecting the third AP 130 at 742, the STA 701 may tune to the operating channel where the BSS for the third AP 130 is operating. In the operating channel, the STA 701 can send frames to the third AP 130. At 795, the STA 701 establishes a wireless association with the selected third AP 130. In some implementations, the third AP 130 schedules the use of the operating channel. If the operating channel is scheduled by the third AP 130, the STA 701 may wait for a trigger frame 792 that allocates random resource units (Rus) that the STA 701 can contend for access to the operating channel. Alternatively, the STA 701 can contend to send the frames in another unlicensed frequency band (such as a frequency band different from the 6 GHz frequency band) if the third AP 130 has indicated that it is also operating in that other band. For example, the third discovery message 732 may indicate a list of channels which the third AP 130 is operating.

Figure 8:
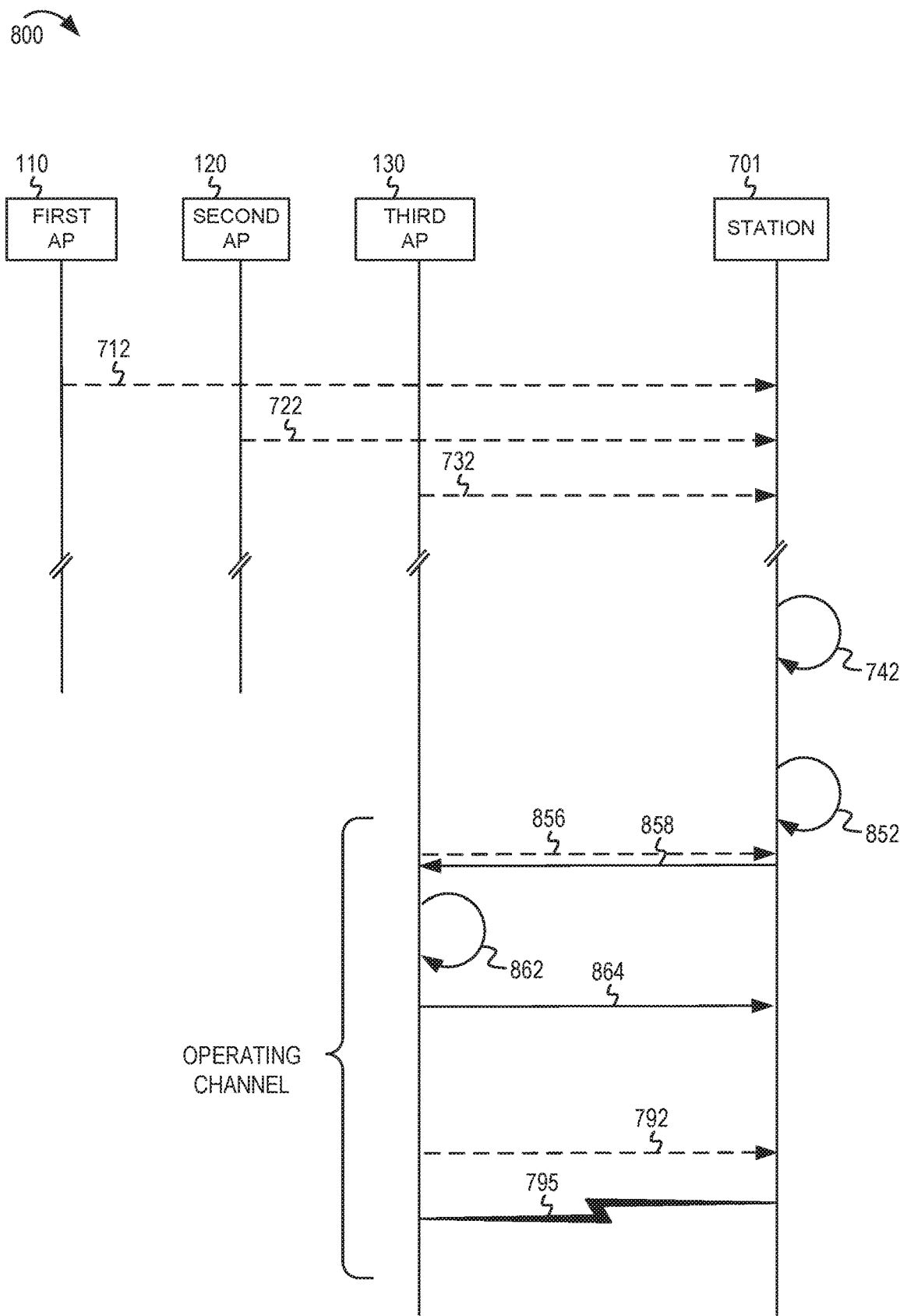
FIG. 8 depicts a message flow diagram of example messages in which a station can negotiate operating parameters with an AP.

FIG. 8 depicts a message flow diagram of example messages in which a station can negotiate operating parameters with an AP. The message flow diagram 800 shows the first AP 110, the second AP 120, and the third AP 130 sending discovery information to the STA 701, similar to FIG. 7. Similar to FIG. 8, at 742, the STA 701 may select the third AP 130. However, FIG. 8 differs from FIG. 7 in that the third AP 130 may permit a negotiation of operating parameters.

For example, in some cases, either the STA 701 or the third AP 130 may not satisfy the requirements of the other. In such a case the STA 701 may negotiate one or more operating parameters with the third AP 130. The STA 701 can send a request 858 (on the operating channel for the third AP 130) to inquire if the third AP 130 may permit the STA 701 to associate even though the STA 701 may not satisfy a requirement of the third AP 130 that was advertised in the third discovery message 732. In some implementations, the STA 701 may wait for a trigger frame 856 before sending the request 858.

The third AP 130 may process the request at 862. In the example of FIG. 8, the third AP 130 determines to agree with the request. The third AP 130 may transmit a response 864 to indicate that the request has been granted. The message flow diagram 800 continues with the operations at 792 and 795 as described in FIG. 7.

In some implementations, the third AP 130 may preemptively advertise that the third AP 130 will permit a negotiation. For example, an indicator in the third AP 130 may indicate that the third AP 130 will permit the negotiation on the operating channel.

Figure 9:
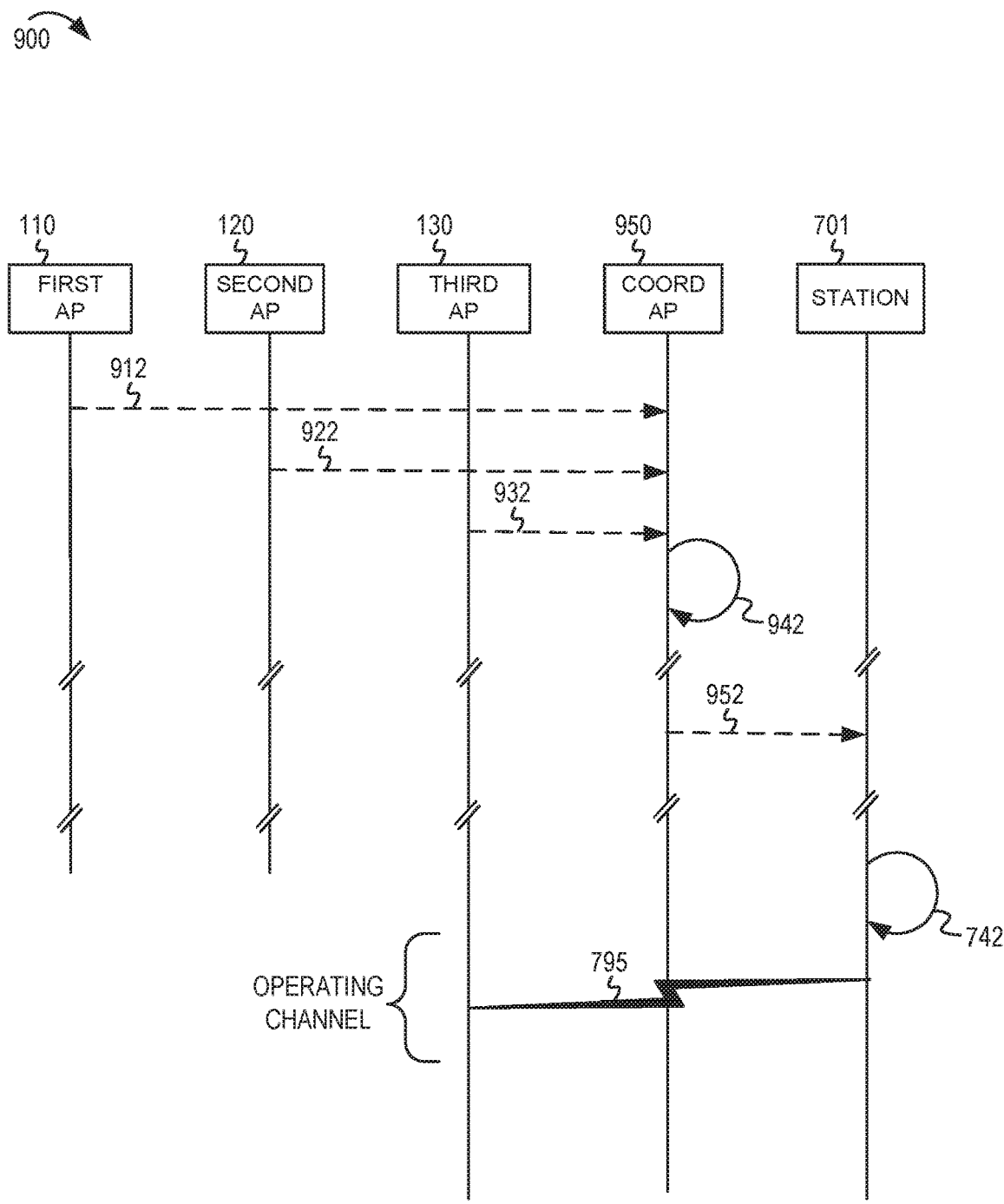
FIG. 9 depicts a message flow diagram of example messages in which a coordinating AP can provide aggregated discovery information.

FIG. 9 depicts a message flow diagram of example messages in which a coordinating AP can provide aggregated discovery information. The message flow diagram 900 shows the first AP 110, the second AP 120, the third AP 130 and the STA 701, similar to FIG. 7. However, FIG. 9 differs from FIG. 7 in that the message flow diagram 900 shows a coordinating AP 950 which may be used to send aggregated discovery information on the dedicated discovery channel. In some implementations, the coordinating AP 950 may be an AP that is utilizing an operating channel for a BSS of its own. In some implementations, the coordinating AP 950 may be a central controller, central access point (CAP), router, or some other device which is capable of collecting and aggregating discovery information from multiple APs. For example, the coordinating AP 950 may or may not have an operating channel of its own, but may be configured for managing and broadcasting the discovery information on the dedicated discovery channel.

The message flow diagram 900 shows the first AP 110, the second AP 120, and the third AP 130 sending the discovery information to the coordinating AP 950 which can aggregate the discovery information for multiple APs. For example, the first AP 110 sends a first discovery message 912 to the coordinating AP 950. The second AP 120 sends a second discovery message 922 to the coordinating AP 950. The third AP 130 sends a third discovery message 932 to the coordinating AP 950. In some implementations, each of the discovery messages 912, 922, and 932 are transmitted on the dedicated discovery channel. In some implementations, the discovery messages 912, 922, and 932 may be transmitted to the coordinating AP 950 using one or more different channels than the dedicated discovery channel.

At 942, the coordinating AP 950 may aggregate the discovery information from the discovery messages 912, 922, and 932. At 952, the coordinating AP 950 may transmit the aggregated discovery information on the dedicated discovery channel. The STA 701 can monitor the dedicated discovery channel to obtain the aggregated discovery information for the multiple APs (including the first AP 110, the second AP 120, and the third AP 130). The message flow diagram 800 continues with the operations at 742 and 795 as described in FIG. 7.

Figure 10:
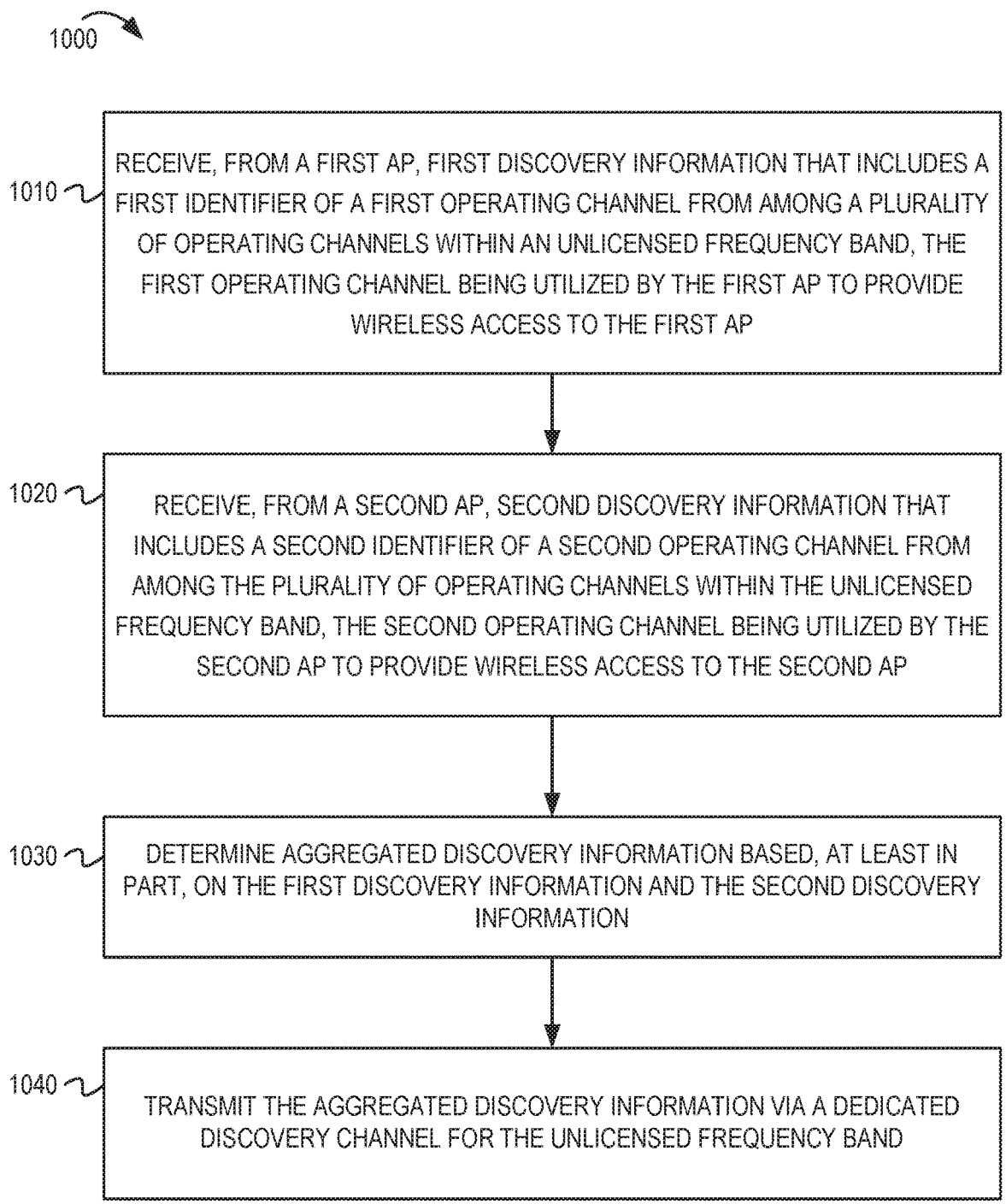
FIG. 10 depicts a flowchart for a coordinating AP capable of providing aggregated discovery information via a dedicated discovery channel for an unlicensed frequency band.

FIG. 10 depicts a flowchart for a coordinating AP capable of providing aggregated discovery information via a dedicated discovery channel for an unlicensed frequency band. The flowchart 1000 begins at block 1010.

At block 1010, the coordinating AP may receive, from a first AP, first discovery information that includes a first identifier of a first operating channel from among various operating channels within an unlicensed frequency band. The first operating channel may be utilized by the first AP to provide wireless access to the first AP.

At block 1020, the coordinating AP may receive, from a second AP, second discovery information that includes a second identifier of a second operating channel from among the various operating channels within the unlicensed frequency band. The second operating channel may be utilized by the second AP to provide wireless access to the second AP.

At block 1030, the coordinating AP may determine aggregated discovery information based, at least in part, on the first discovery information and the second discovery information.

At block 1040, the coordinating AP may transmit the aggregated discovery information via a dedicated discovery channel for the unlicensed frequency band.

Figure 11:
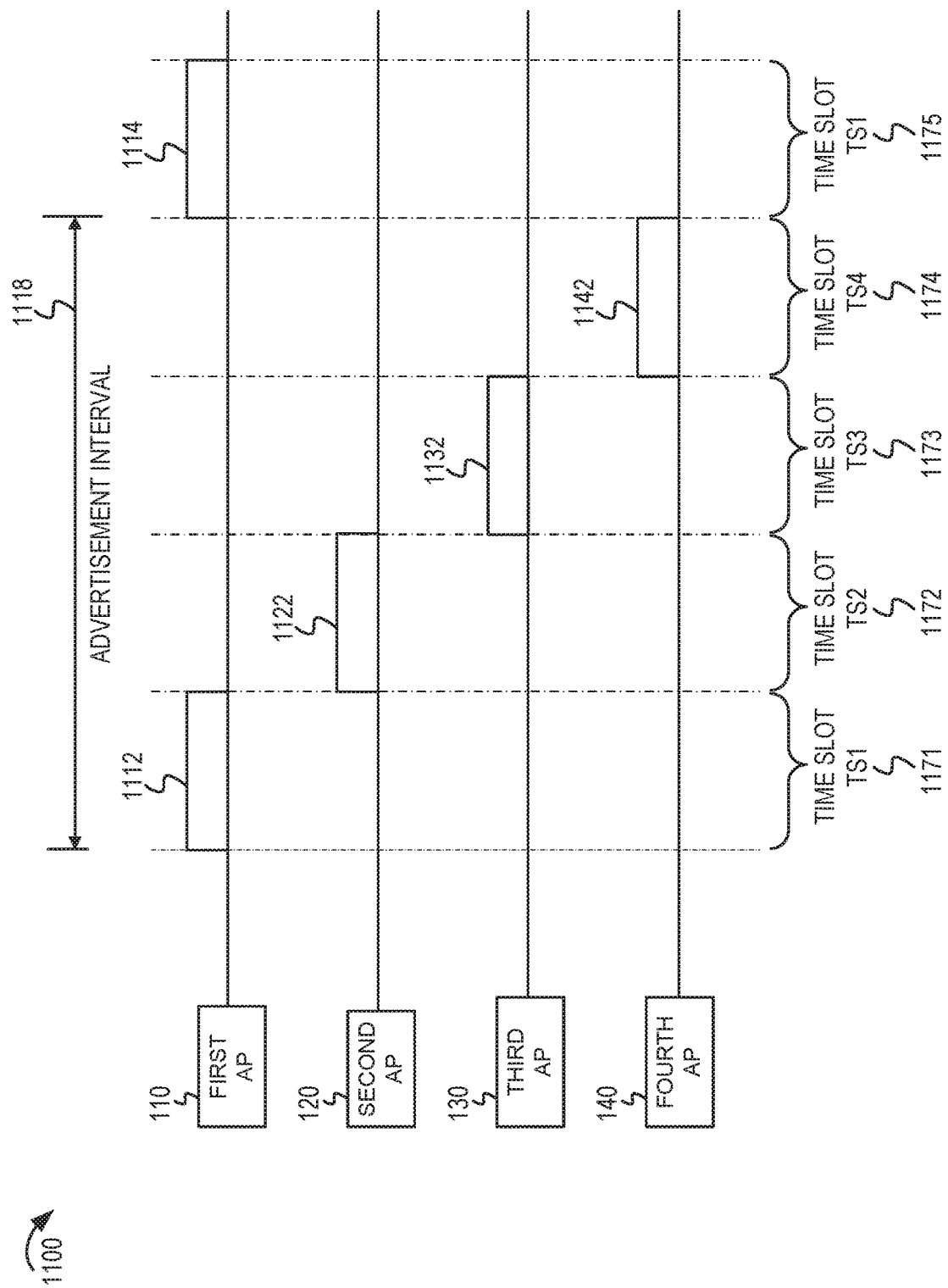
FIG. 11 depicts a message timing diagram in which APs transmit discovery information in separate timeslots.

FIG. 11 depicts a message timing diagram in which APs transmit discovery information in separate timeslots. As mentioned above, the APs may use a collision avoidance mechanism (or contention-based access mechanism) to access the dedicated discovery channel. However, in FIG. 11, each AP has an assigned timeslot. Thus, FIG. 11 shows a timeslot based mechanism for scheduling when the APs can transmit discovery information.

The message timing diagram 1100 shows discovery messages 1112, 1122, 1132, and 1142 transmitted by a first AP 110, second AP 120, third AP 130 and fourth AP 140, respectively. A first discovery message 1112 is transmitted by the first AP 110 during a first timeslot TS1 1171. A second discovery message 1122 is transmitted by the second AP 120 during a second timeslot TS2 1172. A third discovery message 1132 is transmitted by the third AP 130 during a third timeslot TS3 1173. A fourth discovery message 1142 is transmitted by the fourth AP 140 during a fourth timeslot TS4 1174.

In the example of FIG. 11, the dedicated discovery channel is split into four repeating timeslots. Thus, after TS1, TS2, TS3, and TS4, the next timeslot will be timeslot TS1 1175. The first AP 110 is configured to transmit discovery information according to a periodic advertisement interval 1118 which is every four timeslots. Thus, the first AP 110 transmits a fifth discovery message 1114 at the timeslot TS1 1175. Similarly, the second AP 120, the third AP 130, and the fourth AP 140 may repeat transmissions (not shown) in subsequent timeslots according to the pattern.

The example in FIG. 11 shows four APs which are assigned one of four timeslots. Thus, the simple example shows the same quantity of APs and timeslots. Each AP has a separate timeslot which repeats according to the periodic advertisement interval 1118. However, it may be possible that the quantity of APs and the quantity of timeslots will not be the same. If there are less APs than the quantity of timeslots, it may still be possible to assign each AP a separate timeslot for transmitting its discovery information. The unused timeslots may be used when a new AP is added to the environment or may be assigned for some other transmissions (such as coordination between APs regarding the utilization of the operating channels).

Figure 12:
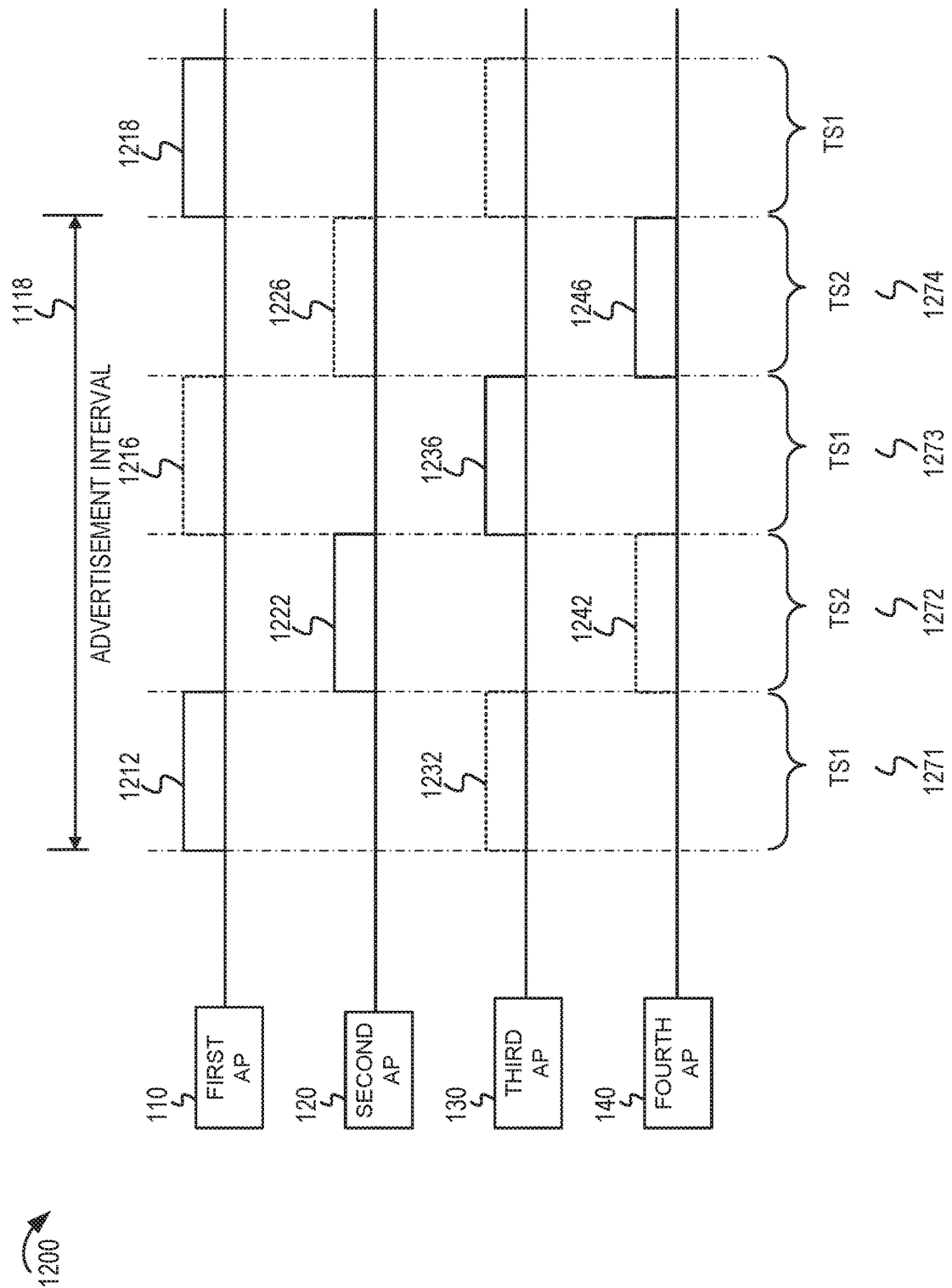
FIG. 12 depicts a message timing diagram in which groups of APs alternate transmission of discovery information in respective timeslots.
Figure 13:
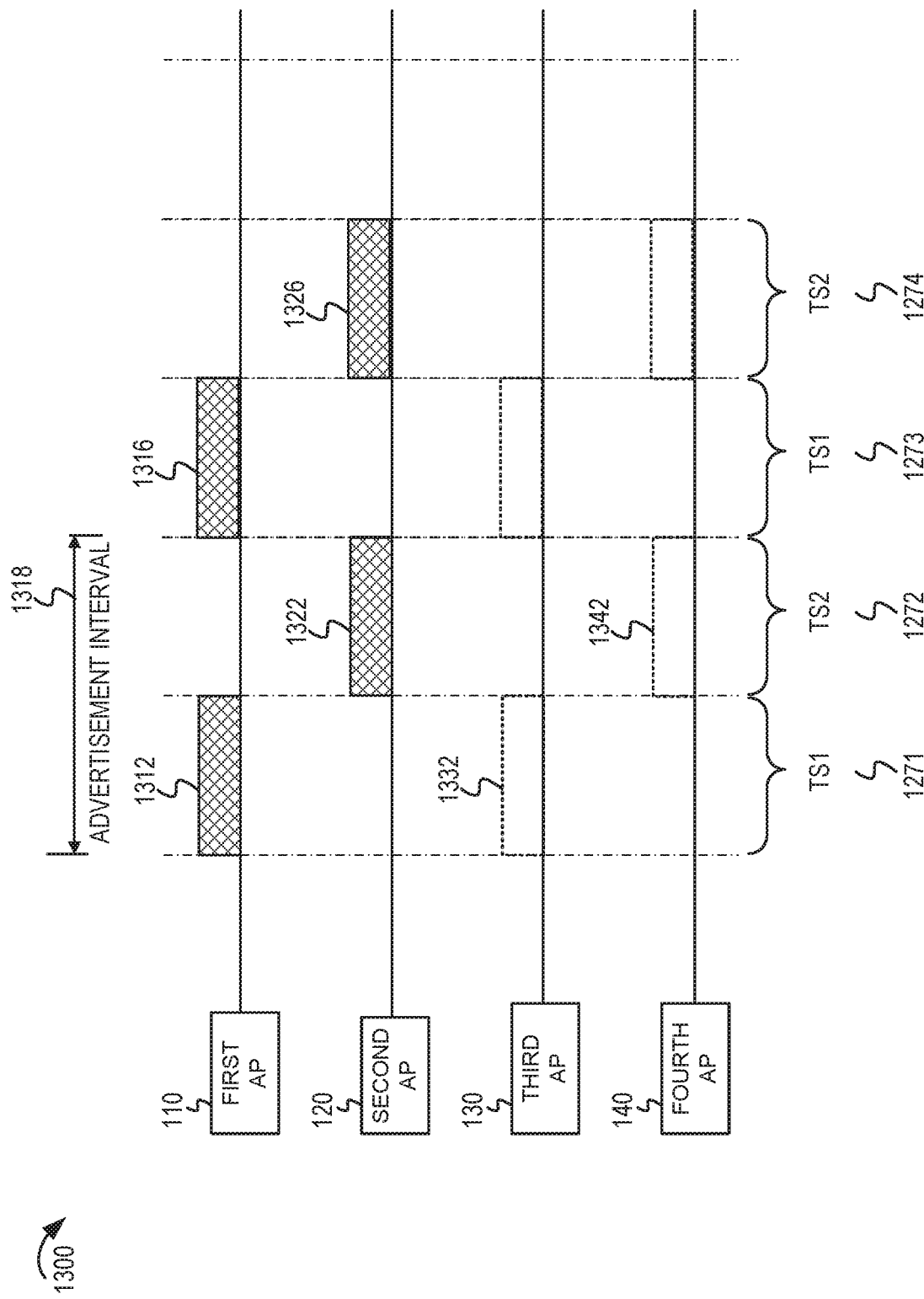
FIG. 13 depicts a message timing diagram in which groups of APs transmit aggregated discovery information.

However, there may be scenarios where the quantity of APs is greater than the quantity of timeslots defined for the dedicated discovery channel. For example, a dense deployment may include 200 APs. However, the dedicated discovery channel may define timeslots of 1 ms for each timeslot. If one AP is configured to transmit discovery information every 100 ms (for example the periodic advertisement interval may be 100 ms for the AP), the AP may not be able to transmit discovery information every 100 ms without impacting the time available for other APs to transmit discovery information on the dedicated discovery channel. FIGS. 12 and 13 provide some solutions which may be used to support more APs in a time-based mechanism on the dedicated discovery channel.

FIG. 12 depicts a message timing diagram in which groups of APs alternate transmission of discovery information in respective timeslots. In FIG. 12, groups of APs may take turns advertising during a particular slot (such as every odd/even slot or every nth occurrence of the timeslot). The message timing diagram 1200 shows two repeating timeslots (such as timeslot TS1 1271, and timeslot TS2 1272) which are shared by four APs (first AP 110, second AP 120, third AP 130 and fourth AP 140). In FIG. 12, the first AP 110 and the third AP 130 are grouped together to share TS1. The second AP 120 and the fourth AP 140 are grouped together to share TS2. Each group will share the TS1 by alternating which AP can transmit during the timeslot. In an example when the group has 3 APs, then each AP may transmit every $3^{rd}$ occurrence of the timeslot.

In the timeslot TS1 1271, the first AP 110 may transmit a first discovery message 1212. Although the third AP 130 is also assigned to use the timeslot TS1 1271, the third AP 130 will refrain (shown at 1232) from sending a discovery message during this occurrence of the timeslot. In the timeslot TS2 1272, the second AP 120 may transmit a second discovery message 1222. Although the fourth AP 140 is also assigned to use the timeslot TS2 1272, the fourth AP 140 will refrain (shown at 1242) from sending a discovery message during this occurrence of the timeslot.

At the next occurrence of TS1 (shown at timeslot TS1 1273), the first AP 110 will refrain (shown at 1216) from transmitting a discovery message. Instead, the third AP 130 will transmit a third discovery message 1236 during that timeslot TS1 1273. Thus, the first AP 110 and third AP 130 have alternated which AP is transmitting discovery information during occurrences of TS1.

Similarly, at the next of occurrence of TS2 (shown at timeslot TS2 1274), the second AP 120 will refrain (shown at 1226) from transmitting a discovery message. Instead, the fourth AP 140 will transmit a fourth discovery message 1246 during that timeslot TS2 1274. Thus, the second AP 120 and fourth AP 140 have alternated which AP is transmitting discovery information during occurrences of TS2. The pattern may repeat (not shown) for subsequent occurrences of TS1 and TS2.

In the example of FIG. 12, the periodic advertisement interval 1118 is equivalent to four timeslots. Thus, even though the dedicated discovery channel is defined to include two repeating timeslots, the first AP 110 will still send a discovery message 1218 at the end of the periodic advertisement interval 1118. However, there may be implementations when the quantity of APs assigned to the repeating timeslots prevents an AP from transmitting discovery information within the time period associated with the advertisement interval. In this case, it may be possible for one AP to include discovery information for another AP, as shown in FIG. 13.

FIG. 13 depicts a message timing diagram in which groups of APs transmit aggregated discovery information. The message timing diagram 1300 shows two repeating timeslots (such as timeslot TS1 1271, and timeslot TS2 1272) which are shared by four APs (first AP 110, second AP 120, third AP 130 and fourth AP 140). In FIG. 13, the first AP 110 and the third AP 130 are grouped together to share TS1. The second AP 120 and the fourth AP 140 are grouped together to share TS2. However, different from FIG. 12, the first AP 110 and the third AP 130 may be capable of transmitting aggregating discovery information for their respective group of APs. For example, the first AP 110 and the second AP 120 could advertise the discovery information for the other APs that share the timeslot for their group.

At the timeslot TS1 1271, the first AP 110 may transmit a first discovery message 1312 which includes aggregated discovery information for the first AP 110 and the third AP 130. The third AP 130 may refrain (shown at 1332) from transmitting. Similarly, at timeslot TS2 1272, the second AP 120 may transmit a second discovery message 1322 which includes aggregated discovery information for the second AP 120 and the fourth AP 140. The fourth AP 140 may refrain (shown at 1342) from transmitting. The pattern may repeat for subsequent occurrences of TS1 and TS2. For example, at timeslot TS1 1273, the first AP 110 may transmit a third discovery message 1316 with aggregated discovery information for the first AP 110 and the third AP 130. At timeslot TS2 1274, the second AP 120 may transmit a fourth discovery message 1326 with aggregated discovery information for the second AP 120 and the fourth AP 140. By aggregating discovery information among groups of APs, it may be possible to reduce the quantity of timeslots defined for the dedicated discovery channel. As a result, the STA may receive discovery information with a shorter advertisement interval (such as advertisement interval 1318 which is equivalent to the timer period for two timeslots).

There may be various ways to group APs into assigned timeslots. For example, a central coordinator may assign the timeslots for use by each AP. The central coordinator also may indicate a group of APs for the timeslot.

Figure 14A:
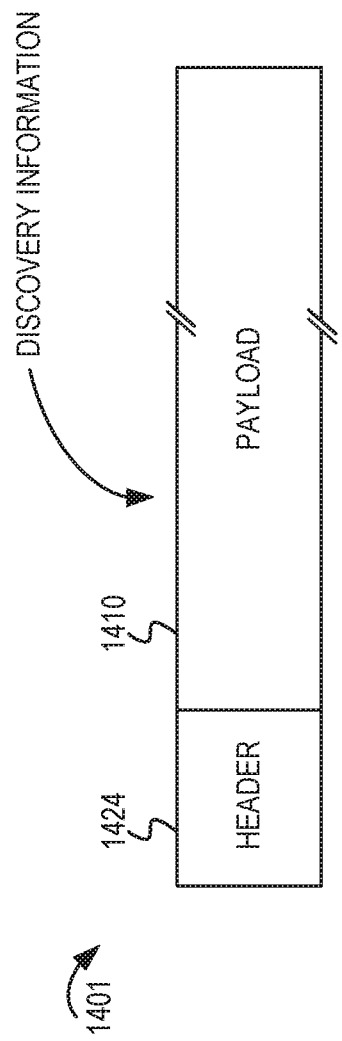
FIG. 14A depicts a conceptual diagram of an example discovery message for transmitting discovery information.

FIG. 14A depicts a conceptual diagram of an example discovery message for transmitting discovery information. For example, the example discovery message 1401 may be sent from a first AP (or a coordinating AP) via the dedicated discovery channel. The example discovery message 1401 may include a header 1424 and a payload 1410. In some implementations, the header 1424 may include source addresses (such as the network address of the sending AP), the length of data frame, or other frame control information. In some implementations, the header 1424 also may indicate a technology type associated with a technology-specific payload (if the payload 1410 is specific to a particular technology type or types). The payload 1410 may be used to convey the discovery information. The discovery information may be organized or formatted in a variety of ways. The discovery information may also be conveyed using technology-specific formatting associated with different technology types. For example, in some implementations, an AP can generate discovery messages that are distinctive of a certain technology. One example of a discovery message may include an enhanced beacon frame that may be used by IEEE 802.11 (similar to the beacon frames defined for IEEE 802.11ax). Another example of a discovery message may be a synchronization frame or other short frame that may be defined for other technologies (or next generation of IEEE 802.11, beyond 802.11ax). Other types of discovery messages could be used if the AP supports a different technology (different from IEEE 802.11). An example of another technology that could be used to send discovery messages might be LTE, as shown below in FIG. 14D. In some implementations, a combination of different types of discovery messages may be used on the dedicated discovery channel. In some implementations, the same discovery message may include signaling for more than one technology type.

Figure 14B:
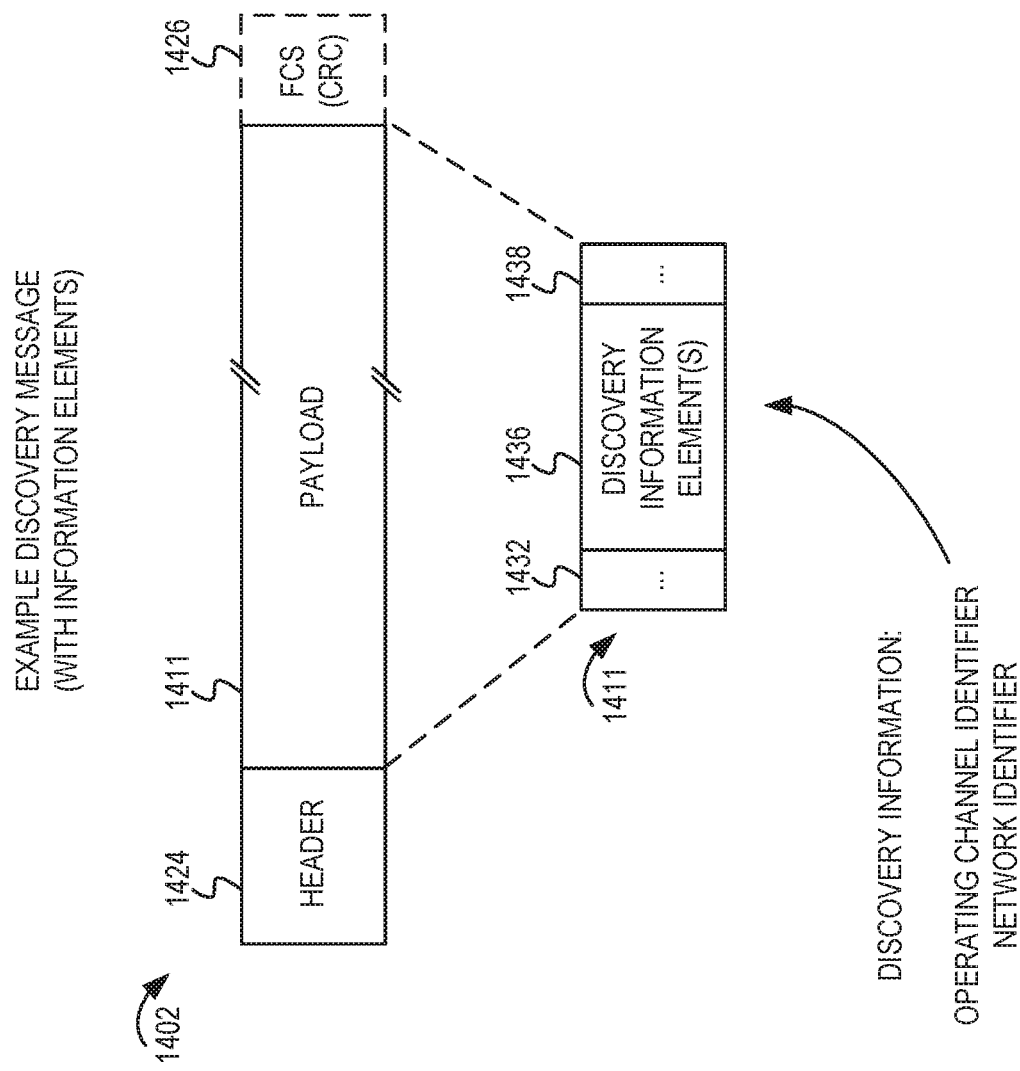
FIG. 14B depicts an example message format for an example discovery message.

FIG. 14B depicts an example message format for an example discovery message. For example, the example discovery message 1402 may be used for IEEE 802.11 devices and may be based on a previously defined beacon message that has been modified to include the discovery information in accordance with this disclosure. The example discovery message 1402 may include a header 1424, a payload 1411, and an optional frame check sequence (FSC) 1426. The payload 1411 may be organized with a message format and may include discovery information elements 1432, 1436, and 1438. The discovery information elements may include, for example, an operating channel identifier and a network identifier. For example, the network identifier may be an SSID associated with a BSS using an operating channel identified by the operating channel identifier.

Figure 14C:
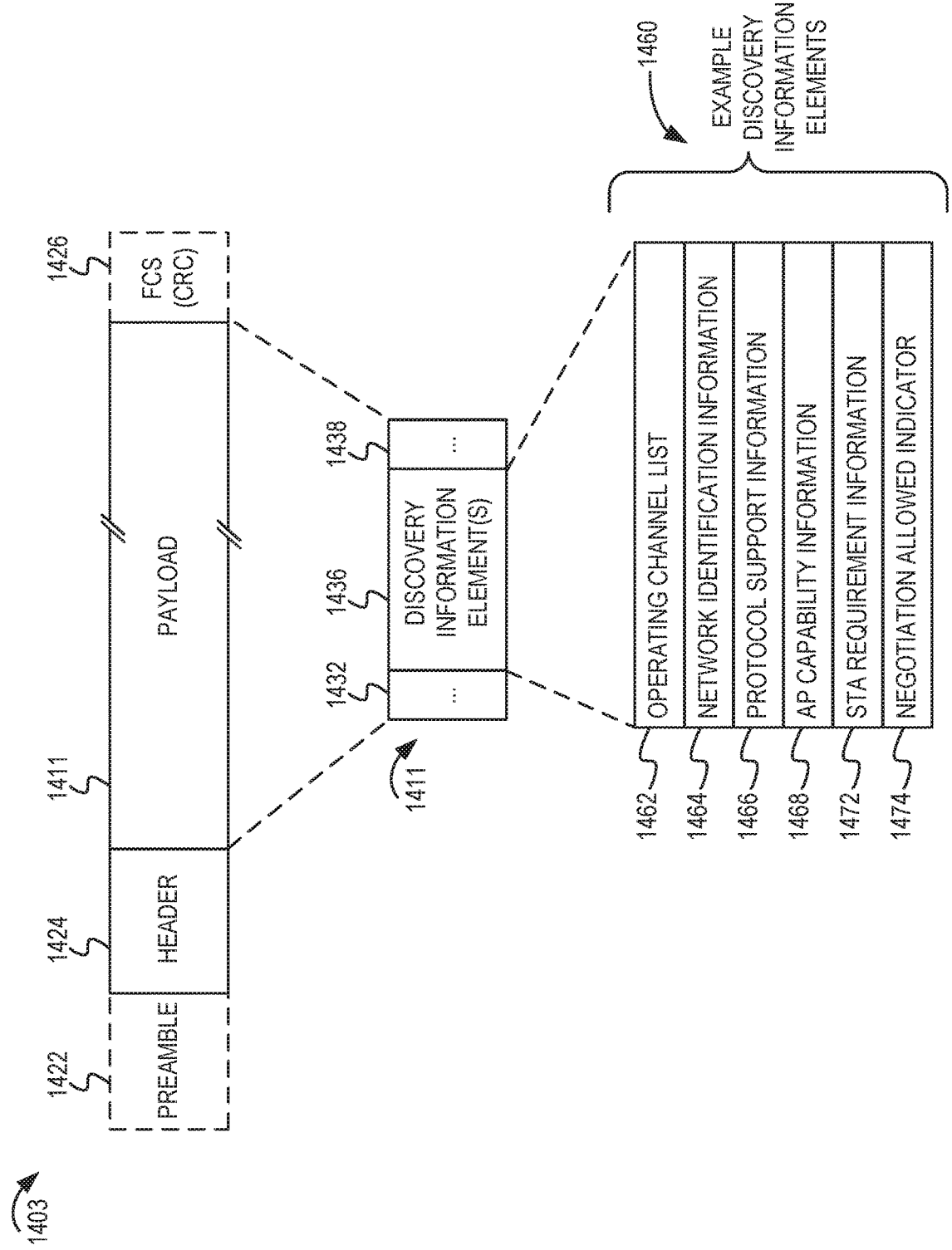
FIG. 14C depicts an example message format for an example discovery message and example discovery information elements.

FIG. 14C depicts an example message format for an example discovery message and example discovery information elements. The example discovery message 1403 may include a header 1424, a payload 1411, and an optional frame check sequence (FSC) 1426. In some implementations, the example discovery message 1403 may include a preamble 1422. The preamble 1422 may be used, for example, when the dedicated discovery channel uses a listen-before-talk, contention-based access, or carrier sense access. For example, the preamble 1422 may include one or more bits to establish synchronization. In some implementations, if the dedicated discovery channel uses a scheduled timeslot for transmission, the preamble 1422 may be omitted. Similar to FIG. 14B, the payload 1411 may be organized with a message format and may include discovery information elements 1432, 1436, and 1438. The discovery information elements may be used to share discovery information regarding a described AP. Several examples of information elements 1460 are illustrated in FIG. 14C. The information elements 1460 may include an operating channel list 1462. For example, the operating channel list 1462 may have identifiers of one or more operating channels being used by the AP. The information elements 1460 also may include network identification information 1464. For example, the network identification information 1464 may include the SSID of a BSS on the operating channel. Optionally, the network identification information 1464 may indicate conditions regarding the BSS, such as channel utilization, the number of wireless stations associated with the BSS, link data rate, and scheduling behavior. Other examples of discovery information elements 1460 that may be included in the discovery frame 1420 may include protocol support information 1466, AP capability information 1468, STA requirement information 1472, and a negotiation allowed indicator 1474.

Figure 14D:
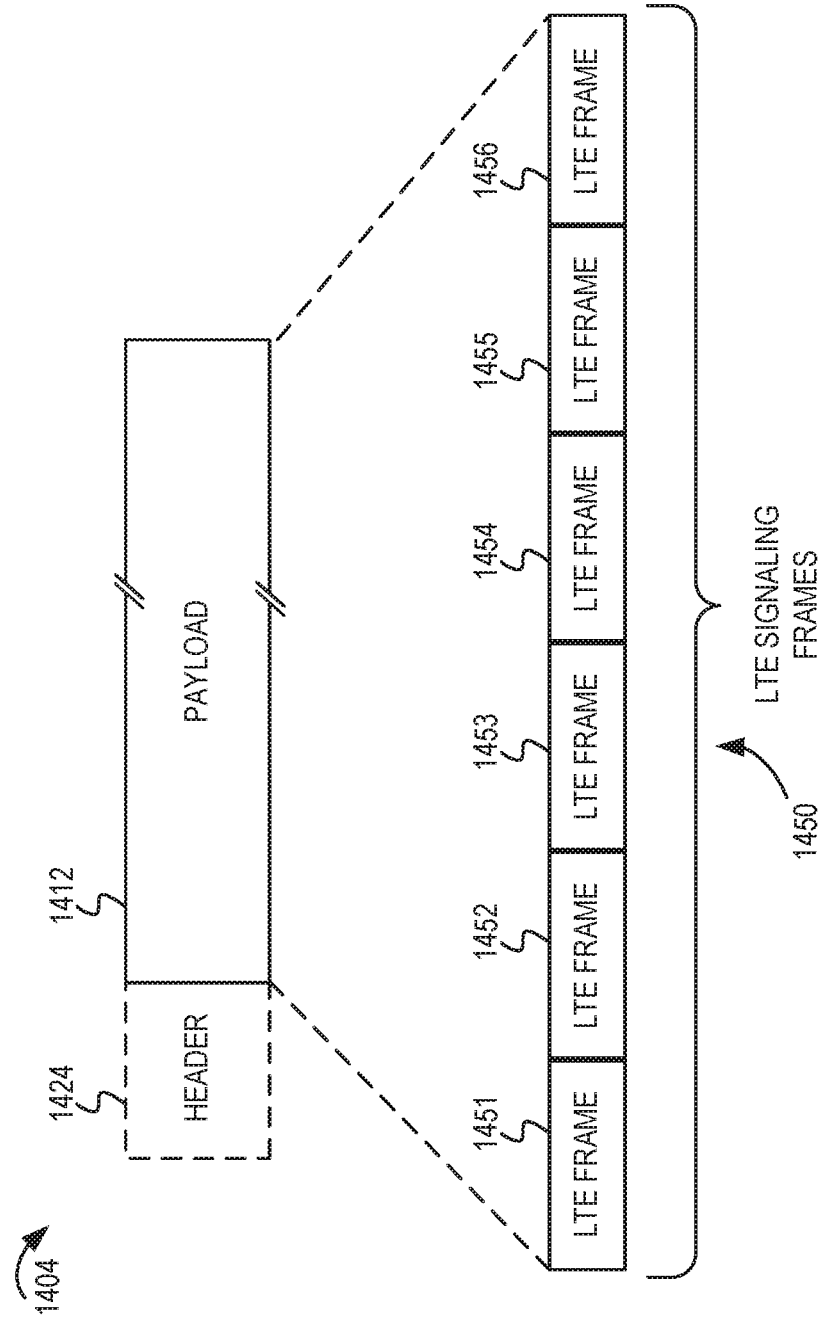
FIG. 14D depicts a conceptual diagram of an example discovery message with long-term evolution (LTE) signaling frames.

FIG. 14D depicts a conceptual diagram of an example discovery message with LTE signaling frames. The example discovery message 1404 may include a header 1424 and a payload 1412. In some implementations, the header may be omitted, such as when the dedicated discovery channel utilizes only LTE signaling or if the LTE signaling occupies a dedicated time period in the dedicated discovery channel. The payload 1412 may include one or more LTE signaling frames 1450 (such as LTE signaling frames 1451, 1452, 1453, 1454, 1455, 1456). The discovery information may be included in the LTE signaling frames 1450. In some implementations, the payload 1412 may include a combination (not shown) of both discovery information elements and LTE signaling frames. For example, if the AP supports both IEEE 802.11 and LTE, the payload 1412 may include discovery information that is encoded in both formats.

Figure 15:
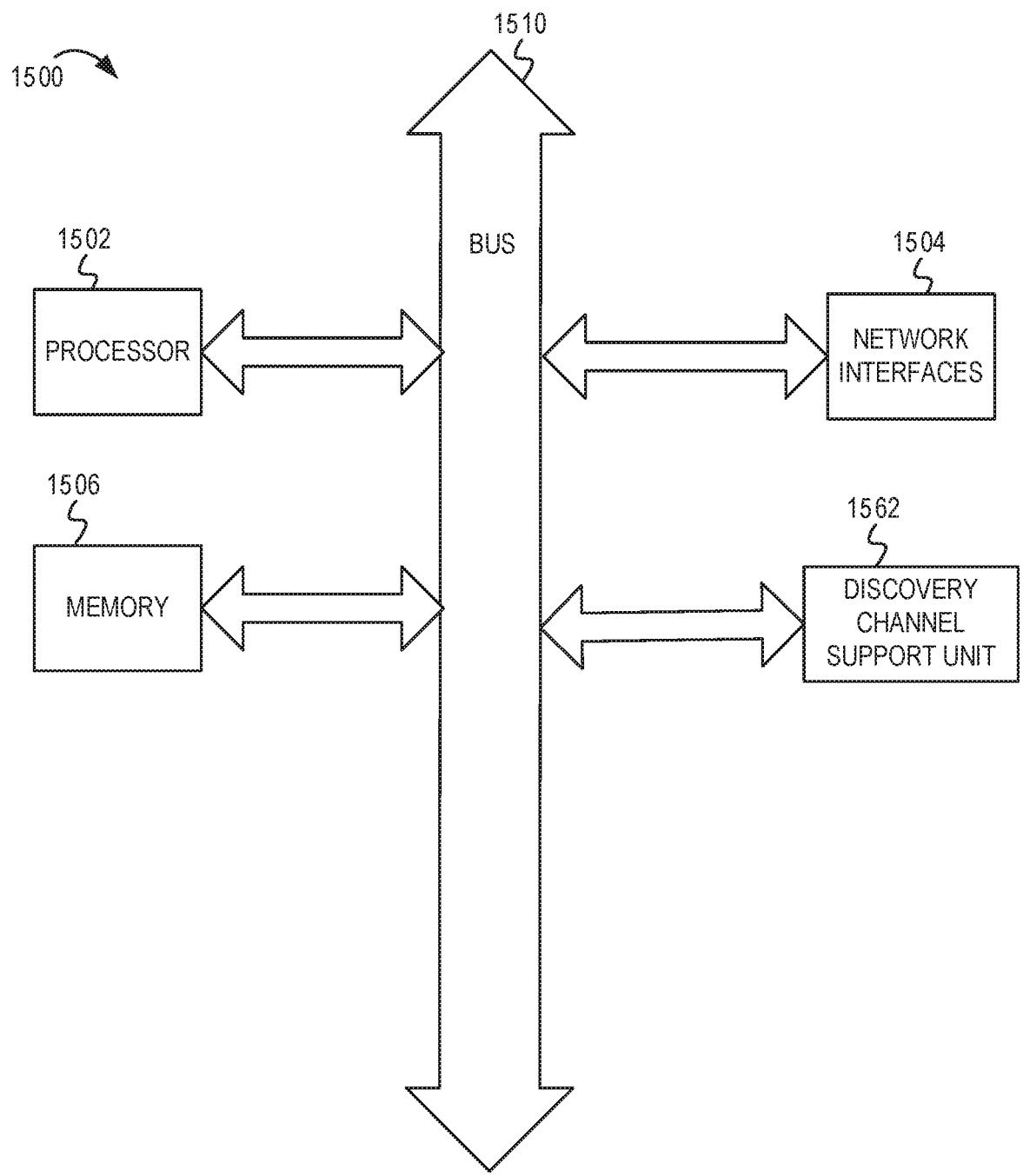
FIG. 15 shows a block diagram of an example electronic device for implementing aspects of this disclosure.

FIG. 15 shows a block diagram of an example electronic device for implementing aspects of this disclosure. In some implementations, the electronic device 1500 may be one of an access point (including any of the APs described herein), a station (including the STAs described herein), or other electronic systems. The electronic device 1500 can include a processor unit 1502 (possibly including multiple processors, multiple cores, multiple nodes, or implementing multi-threading, etc.). The electronic device 1500 also can include a memory unit 1506. The memory unit 1506 may be system memory or any one or more of the below-described possible realizations of computer-readable media. The electronic device 1500 also can include a bus 1510 (such as PCI, ISA, PCI-Express, HyperTransport®, InfiniBand®, NuBus, AHB, AXI, etc.), and a network interface 1504 that can include at least one of a wireless network interface (such as a WLAN interface, a Bluetooth® interface, a WiMAX interface, a ZigBee® interface, a Wireless USB interface, etc.) and a wired network interface (such as an Ethernet interface, a powerline communication interface, etc.). In some implementations, the electronic device 1500 may support multiple network interfaces—each of which is configured to couple the electronic device 1500 to a different communication network.

The electronic device 1500 may include a discovery channel support unit 1562. In some implementations, the discovery channel support unit 1562 can be distributed within the processor unit 1502, the memory unit 1506, and the bus 1510. The discovery channel support unit 1562 can perform some or all of the operations described in FIGS. 1-14D above. For example, if the electronic device 1500 is an AP, the discovery channel support unit 1562 may transmit discovery information via the dedicated discovery channel. If the electronic device 1500 is a STA, the discovery channel support unit 1562 may be configured to monitor the dedicated discovery channel and receive the discovery information from one or more APs.

The memory unit 1506 can include computer instructions executable by the processor unit 1502 to implement the functionality of the implementations described in FIGS. 1-14D above. Any one of these functionalities may be partially (or entirely) implemented in hardware or on the processor unit 1502. For example, the functionality may be implemented with an application specific integrated circuit, in logic implemented in the processor unit 1502, in a co-processor on a peripheral device or card, etc. Further, realizations may include fewer or additional components not illustrated in FIG. 15 (such as video cards, audio cards, additional network interfaces, peripheral devices, etc.). The processor unit 1502, the memory unit 1506, the network interface 1504, and the network configurator unit 1508 are coupled to the bus 1510. Although illustrated as being coupled to the bus 1510, the memory unit 1506 may be coupled to the processor unit 1502.

FIGS. 1-15 and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of various examples with their associated operations, a person skilled in the art would appreciate that a combination of operations from any number of different examples is also within the scope of the aspects of the disclosure.

Another innovative aspect of the subject matter described in this disclosure can be implemented in a first station (STA). The first STA may receive, from a first AP, first discovery information via a dedicated discovery channel for an unlicensed frequency band. The first discovery information may include a first identifier of a first operating channel from among various operating channels within the unlicensed frequency band. The first operating channel may be utilized by the first AP to provide wireless access to a network. The first STA may associate with the first AP on the first operating channel.

In some implementations, receiving the discovery information may include monitoring a single channel that has been designated as the dedicated discovery channel for the unlicensed frequency band.

In some implementations, first STA may monitor the dedicated discovery channel for at least a time period associated with a first periodic interval.

In some implementations, the first periodic interval is specified by a first technology standard adopted by the first STA.

In some implementations, the first discovery information may further include at least one member selected from a group consisting of basic service set (BSS) information, service set identification (SSID), operating parameters for the first operating channel, wireless service capabilities of the first AP, a list of supported protocols, and a list of other channels being utilized by the first AP.

In some implementations, the first STA may receive, from a second AP, second discovery information via the dedicated discovery channel. The second discovery information may include a second identifier of a second operating channel being utilized by the second AP to provide wireless access to the network. The first STA may select the first AP based, at least in part, on the first discovery information and the second discovery information.

In some implementations, the first discovery information may further include an identifier of a second operating channel utilized by a second AP. The first STA may determine service capabilities for the first AP and the second AP. The first STA may select the first AP based, at least in part, on the first discovery information and the service capabilities.

In some implementations, determining the service capabilities may include at least one member selected from a group consisting of determining signal strengths for the first operating channel and the second operating channel, and determining the service capabilities based, at least in part, on operating parameters of the first AP and the second AP. The operating parameters may be included in the first discovery information.

In some implementations, the first discovery information may further include an indicator to indicate whether the first AP will permit a negotiation of one or more operating parameters shared between the first AP and the first STA. The first STA may negotiate, via the first operating channel, the one or more operating parameters shared between the first AP and the first STA.

In some implementations, the first discovery information may be included in a technology-specific payload of a message received on the dedicated discovery channel. The first STA may decode a header of the message, wherein the header indicates a technology type of the technology-specific payload. The first STA may determine whether the first STA can utilize the technology type. The first STA may decode the technology-specific payload if the first station utilizes the technology type. The first STA may disregard the technology-specific payload if the first station does not utilize the technology type.

In some implementations, disregarding the technology-specific payload may include entering a power saving mode for at least a remaining duration of the message.

In some implementations, receiving the first discovery information via the dedicated discovery channel may obviate an active scan or passive scan of one or more operating channels associated with the unlicensed frequency band.

Another innovative aspect of the subject matter described in this disclosure can be implemented in a coordinating AP. The coordinating AP may receive, from a first AP, first discovery information that includes a first identifier of a first operating channel from among various operating channels within an unlicensed frequency band. The first operating channel may be utilized by the first AP to provide wireless access to the first AP. The coordinating AP may receive, from a second AP, second discovery information that includes a second identifier of a second operating channel from among the various operating channels within the unlicensed frequency band. The second operating channel may be utilized by the second AP to provide wireless access to the second AP. The coordinating AP may determine aggregated discovery information based on the first discovery information and the second discovery information. The coordinating AP may transmit the aggregated discovery information via a dedicated discovery channel for the unlicensed frequency band.

In some implementations, the coordinating AP may be a central coordinator for allocating channels to one or more APs that utilize the unlicensed frequency band.

In some implementations, the first discovery information and the second discovery information may further include operating parameters associated with each of the first AP and the second AP, respectively. Determining the aggregated discovery information may comprise including at least a portion of the operating parameters in the aggregated discovery information.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a station (STA), comprising:
   monitoring a discovery channel within a 6 Gigahertz (GHz) unlicensed frequency band for first discovery information associated with a first technology, wherein a technology standard specifies the discovery channel and further specifies a first periodic time interval for communication of the first discovery information associated with the first technology via the discovery channel; and
   receiving, via the discovery channel, the first discovery information from at least a first AP within the first periodic time interval, wherein the discovery channel is shared with stations of a second technology for which the technology standard specifies a second periodic time interval for communication of second discovery information associated with the second technology.

2. The method of claim 1, wherein the first discovery information includes service set identifier (SSID) information and corresponding operating channels utilized by the first AP.

3. The method of claim 1, wherein monitoring the discovery channel includes obtaining the first discovery information on the discovery channel to avoid active or passive scanning on other channels within the 6 GHz unlicensed frequency band.

4. The method of claim 1, wherein the technology standard is IEEE 802.11ax or a later amendment to IEEE 802.11.

5. The method of claim 1, further comprising:
   entering a power saving mode in association with the second periodic time interval and disregarding the communication of the second discovery information.

6. The method of claim 1, wherein receiving the first discovery information comprises receiving a broadcast discovery message on the discovery channel.

7. The method of claim 1, wherein the first discovery information includes at least one member selected from a group consisting of service set identification (SSID) information, operating parameters for a first operating channel, wireless service capabilities of the first AP, a list of supported protocols, and a list of other channels being utilized by the first AP.

8. The method of claim 1, wherein the first discovery information indicates at least a first Basic Service Set (BSS) managed by the first AP on a first operating channel, the method further comprising:
   tuning to the first operating channel; and
   establishing a wireless association with the first BSS managed by the first AP on the first operating channel.

9. An apparatus of a station, comprising:
   a processor configured to monitor a discovery channel within a 6 Gigahertz (GHz) unlicensed frequency band for first discovery information associated with a first technology, wherein a technology standard specifies the discovery channel and further specifies a first periodic time interval for communication of the first discovery information associated with the first technology via the discovery channel, and
   an interface configured to obtain, via the discovery channel, the first discovery information from at least a first AP within the first periodic time interval, wherein the discovery channel is shared with stations of a second technology for which the technology standard specifies a second periodic time interval for communication of second discovery information associated with the second technology.

10. The apparatus of claim 9, wherein the first discovery information includes service set identifier (SSID) information and corresponding operating channels utilized by the first AP.

11. The apparatus of claim 9, wherein monitoring of the discovery channel includes obtaining the first discovery information on the discovery channel to avoid active or passive scanning on other channels within the 6 GHz unlicensed frequency band.

12. The apparatus of claim 9, wherein the technology standard is IEEE 802.11ax or later amendment to IEEE 802.11.

13. The apparatus of claim 9, wherein the interface is further configured to:
   enter a power saving mode in association with the second periodic time interval and disregard the communication of the second discovery information.

14. The apparatus of claim 9, wherein obtainment of the first discovery information includes obtainment of a broadcast discovery message on the discovery channel.

15. The apparatus of claim 9, wherein the first discovery information includes at least one member selected from a group consisting of service set identification (SSID) information, operating parameters for a first operating channel, wireless service capabilities of the first AP, a list of supported protocols, and a list of other channels being utilized by the first AP.

16. The apparatus of claim 9, wherein the first discovery information indicates at least a first Basic Service Set (BSS) managed by the first AP on a first operating channel, and wherein the interface is further configured to:
   tune to the first operating channel; and
   establish a wireless association with the first BSS managed by the first AP on the first operating channel.

17. A computer-readable memory including instructions which, when executed by a processor, cause the processor to perform operations for controlling a station in a wireless local area network, the instructions comprising instructions to:
   monitor a discovery channel within a 6 Gigahertz (GHz) unlicensed frequency band for first discovery information associated with a first technology, wherein a technology standard specifies the discovery channel and further specifies a first periodic time interval for communication of the first discovery information associated with the first technology via the discovery channel; and
   obtain, via the discovery channel, the first discovery information from at least a first AP within the first periodic time interval, wherein the discovery channel is shared with stations of a second technology for which the technology standard specifies a second periodic time interval for communication of second discovery information associated with the second technology.

18. The computer-readable memory of claim 17, wherein the first discovery information includes service set identifier (SSID) information and corresponding operating channels utilized by the first AP.

19. The computer-readable memory of claim 17, wherein the instructions to monitor the discovery channel include instructions to obtain the first discovery information on the discovery channel to avoid active or passive scanning on other channels within the 6 GHz unlicensed frequency band.

20. The computer-readable memory of claim 17, wherein the technology standard is IEEE 802.11ax or later amendment to IEEE 802.11.

21. The computer-readable memory of claim 17, the instructions further including instructions to:
   enter a power saving mode in association with the second periodic time interval and disregard the communication of the second discovery information.

22. The computer-readable memory of claim 17, wherein the instructions to obtain the first discovery information include instructions to obtain a broadcast discovery message on the discovery channel.

23. The computer-readable memory of claim 17, wherein the first discovery information includes at least one member selected from a group consisting of service set identification (SSID) information, operating parameters for a first operating channel, wireless service capabilities of the first AP, a list of supported protocols, and a list of other channels being utilized by the first AP.

24. The computer-readable memory of claim 17, wherein the first discovery information indicates at least a first Basic Service Set (BSS) managed by the first AP on a first operating channel, and wherein the computer-readable memory includes further instructions to:
   tune to the first operating channel; and
   establish a wireless association with the first BSS managed by the first AP on the first operating channel.

* * * * *